United States Patent [19]
Endo et al.

[11] Patent Number: 4,964,119
[45] Date of Patent: Oct. 16, 1990

[54] METHOD AND SYSTEM FOR PACKET EXCHANGE

[75] Inventors: Noboru Endo, Hachioji; Takahiko Kozaki, Koganei; Hiroshi Kuwahara, Kodaira; Kenichi Ohtsuki, Kanagawa; Shinobu Gohara, Yokohama, all of Japan

[73] Assignee: Hitachi, Ltd., Tokyo, Japan

[21] Appl. No.: 334,211

[22] Filed: Apr. 6, 1989

[30] Foreign Application Priority Data
Apr. 6, 1988 [JP] Japan ................... 63-82927

[51] Int. Cl.$^5$ .......................................... H04Q 11/04
[52] U.S. Cl. ...................... 370/60; 370/94.1
[58] Field of Search .............. 370/60, 94, 53, 58, 370/94.1, 94.2, 60, 58.1, 58.2, 58.3, 60.1

[56] References Cited
U.S. PATENT DOCUMENTS

| | | | |
|---|---|---|---|
| 4,617,657 | 10/1986 | Drynan et al. | 370/94 |
| 4,677,616 | 6/1987 | Franklin | 370/94 |
| 4,692,917 | 9/1987 | Fujioka | 370/60 |
| 4,769,810 | 9/1988 | Eckberg et al. | 370/60 |
| 4,788,679 | 11/1988 | Kataoka et al. | 370/60 |
| 4,799,215 | 1/1989 | Suzukt | 370/60 |
| 4,809,267 | 2/1989 | Higuchi et al. | 370/94.2 |
| 4,823,340 | 4/1989 | Grossman et al. | 370/60 |

FOREIGN PATENT DOCUMENTS
0135994 8/1984 Japan.
0084227 4/1988 Japan ..................... 370/94

Primary Examiner—Douglas W. Olms
Assistant Examiner—Alpus H. Hsu
Attorney, Agent, or Firm—Antonelli, Terry, Stout & Kraus

[57] ABSTRACT

In a packet exchange system for preforming packet exchange by setting logical channels, individual input packets are assigned with information indicative of input sequence of the individual input packets counted in each call and the input sequence information is stored. Each time each packet is delivered, the input sequence information assigned to an input packet is stored as an output sequence information in a call to which the delivered packet belongs, and the status of congestion of packets of the call which are present in the exchange is decided on the basis of the stored input sequence information and output sequence information. This system further includes a rerouting circuit having buffer function and a control device for changing the contents of a conversion table when it detects by looking up the conversion table that the number of packets remaining in the exchange which are destined for a specified output line exceeds a predetermined threshold, whereby input packets scheduled to be destined for the specified output line are temporarily stored in the rerouting circuit.

14 Claims, 20 Drawing Sheets

| OUTPUT LINE NUMBER | OUTPUT LOGICAL CHANNEL NUMBER | INTRA-EXCHANGE SEQUENCE NUMBER | INTRA-EXCHANGE OUTPUT SEQUENCE NUMBER |
|---|---|---|---|
| OC | OL | IS | OS |
|  |  |  |  |
|  |  |  |  |
|  |  |  |  |
|  |  |  |  |

FIG. 13A
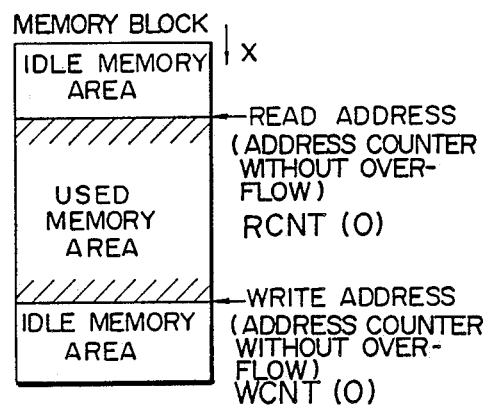
FIG. 13B
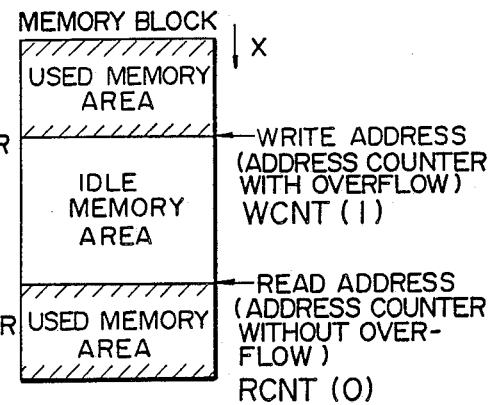
FIG. 14
| STATUS | OVERFLOW 0:PRE-SENT 1:AB-SENT | | ADDRESS COUNTER VALUE |
|---|---|---|---|
| | WCNT | RCNT | |
| INITIAL | 0 | 0 | (WCNT)=0, (RCNT)=0 |
| NORMAL OPERATION | 0 | 0 | (RCNT) ≤ (WCNT)<br>(RCNT)+(WCNT)c−1: IDLE<br>(WCNT)−(RCNT); IN USE |
| | 1 | 0 | (RCNT) ≥ (WCNT)<br>(RCNT)−(WCNT): IDLE<br>(WCNT)+(RCNT)c; IN USE |
| TROUBLE | 0 | 0 | (RCNT) > (WCNT) |
| | 1 | 0 | (RCNT) < (WCNT) |
| | 0 | 1 | NOT RELATED TO VALUES OF (RCNT) AND (WCNT) |
| | 1 | 1 | |

FIG. 17

| TABLE ADDRESS TA | OUTPUT LINE NUMBER OC | REROUTED CALL FLAG FLC | OUTPUT-PERMITTED CALL FLAG FOP |
|---|---|---|---|
| | | | |
| | | | |
| | | | |

FIG. 18

| NUMBER OF PACKET NOP | REROUTING LINE FLAG FLO | OUTPUT-PERMITTED LINE FLAG FOE | REROUTING WAITING CALL TABLE ADDRESS REGISTRATION AREA RWL | OUTPUT-PERMITTED CALL TABLE ADDRESS REGISTRATION AREA RPT | OUTPUT-PERMITTED CALL TABLE ADDRESS REGISTRATION AREA RNT |
|---|---|---|---|---|---|
| | | | | | |
| | | | | | |
| | | | | | |

FIG. 21c (2)

→ 231 IDLE ADDRESS FOR EACH OF THE BUFFER DESTINED ROUTING CONTROL TABLE 21b, INTRA-BUFFER ROUTING CONTROL TABLE 21c, OUTPUT LINE DESTINED ROUTING CONTROL TABLE 21d IS DERIVED FROM THE IDLE ADDRESS MANAGEMENT TABLE 152

→ 232 OC AND OL FOR THE REROUTING CIRCUIT ARE SET IN EACH ADDRESS DETERMINED. THE VALUES OF IS AND OS ARE SET TO A VALUE OF IS WHICH PREVAILS BEFORE THE ROUTING IN THE INTRA-SWITCH ROUTING CONTROL TABLE 21a

→ 233 THE ADDRESS SET IN THE BUFFER DESTINED ROUTING CONTROL TABLE 21b, INTRA-BUFFER ROUTING CONTROL TABLE 21c AND OUTPUT LINE DESTINED ROUTING CONTROL TABLE 21d ARE INFORMED TO THE ADDRESS DISTRIBUTION CIRCUIT

→ 234 FLC IN A LINE SECTION CORRESPONDING TO THE CALL OF TUA IS SET AND THE THREE ADDRESSES DETERMINED IN THE STEP 231 ARE REGISTERED IN THE TUA

→ 235 THE TABLE ADDRESS FOR THE CALL IS DELETED FROM RWL AND IS THEN REGISTERED IN RNT

METHOD AND SYSTEM FOR PACKET EXCHANGE

BACKGROUND OF THE INVENTION

This invention relates in general to packet exchange systems adapted to perform routing assignment for data packet strings of fixed-length packets and more particularly to a high speed packet exchange method and system suitable for exchange of information from multimedia having various bit rates ranging from several bits per second to several of hundreds of M bits per second.

This type of packet exchange system is described in, for example, JP-A-No. 59-135994 entitled "TDM Switching System". In this exchange system, a packet is a data block having a fixed length of N bytes (for example, N=16), of which the initial one byte is representative of a logical channel number for discriminating packets in a multiplexed signal from each other and the following 15 bytes carry information to be transferred to a destination station.

Essentially, the function of the exchange for packets is to assign individual arriving packets, identified by line numbers each transmitting a multiplexed signal carrying information and packet logical channel numbers, with new identifications. The new identification signifies conversion between two attributes of the same kind, i.e., conversion of a packet (s, i) into a packet (t, j), where s is a line number transmitting an incoming multiplexed signal, i is a header, t is a line number transmitting an outgoing multiplexed signal, and j is a new header.

A packet exchange system having the above function will be described with reference to FIG. 2. A packet inputted to the exchange through a multiplex line a, b, . . . or m has a format as shown in FIG. 3A. In the format, an input logical channel number IL corresponds to the aforementioned header i, control information CTL represents either check information for checking errors in the contents of the packet or information indicative of the kind of services applied to the packet, and data DA is information to be transferred to a destination station. Depending on the type of packet, the control information may be omitted.

When one of input control circuits 1a to 1m, assumed to be 1s herein, receives a packet, this input control circuit 1s derives an input logical channel number IL from the received packet, prepares a pair of an input line number IC indicative of the number assigned to a multiplex line s through which the packet is inputted and the IL, and sends to a table management unit 2 a signal S4 indicative of the pair having a format as shown in FIG. 3D. The table management unit 2 includes a routing control table 21 and a table access circuit 22. Stored in the routing control table 21 at an address AT determined, in respect of each call, from the input line number IC and input logical channel number IL are a set of output line number OC and output logical channel number OL. According to the prior art system, the information has been written in the routing control table 21 under the control of a call control processor 6 simultaneously with setting of a call. On the basis of the input line number IC and input logical channel number IL sent from the input control circuit 1s, the table access circuit 22 determines the address TA on routing control table 21 on which exist the output line number OC and output logical channel number OL for a call to which the packet belongs, reads from the routing control table 21 the output line number OC and output logical channel number OL and returns them to the input control circuit 1s.

When receiving the output line number OC and output logical channel number OL, the input control circuit 1s adds this information to data DA, updates the contents of control information CTL present in the received packet as desired or required and thereafter sends the received packet to a packet switch 4. The packet switch 4 sends the received packet from the input control circuit 1s to an output control circuit 5t (desired one of output control circuits 5a to 5n). The output control circuit 5t removes the output line number OC from the packet and delivers to one of output lines a' to n', represented by t' herein, a packet S3 having a format as shown in FIG. 3C.

The above-described prior art system does not perform flow control of packet between one exchange and another or between a terminal device and the exchange and therefore many packets are permitted to arrive at the exchange at a time. If the number of packets arriving at the exchange exceeds the number of packets which can be retained in the exchange, then congestion will occur and an event that many packets in excess of a treatable number are forced to be discarded will occur at a certain probability.

U.S. patent application Ser. No. 07/218,217 filed on July 13, 1988 and assigned to the same assignee also pertains to a packet exchange system.

SUMMARY OF THE INVENTION

The present invention contemplates elimination of the above disadvantages of the prior art and has for its object to provide a method and system for packet exchange which can accurately grasp a congestion status in the exchange.

Another object of the invention is to provide a packet exchange method and system which can avoid the occurrence of congestion in the exchange or rapidly release congestion.

To accomplish the above object, according to one aspect of the invention, in a packet exchange system for performing packet exchange by setting logical channels, individual input packets are assigned with information indicative of input sequence of the individual input packets counted in each call and the input sequence information is stored, the input sequence information assigned to an input packet is stored, each time each packet is delivered, as an output sequence information in a call to which the delivered packet belongs, and the status of packets of the call which are present in the exchange is decided on the basis of the stored input sequence information and output sequence information. The input sequence information and output sequence information are stored in, for example, table means which is looked up when an input logical channel number of each input packet is converted into an output logical channel number. More specifically, in a packet exchange system in which a conversion table is looked up on the basis of an input logical channel number possessed by an input packet and an input line number possessed by an input line for the input packet, to determine a line number for which the packet is scheduled to be destined and an output logical channel number to be assigned to an output packet, packet input sequence number and output sequence numbers set for packets in respect of each call are stored on the conversion table, the conversion table is looked up when a packet of a call is inputted to assign an output line number and an output logical channel number to the packet, an input sequence number possessed by the packet is stored, when the packet is delivered through the switch means to an output line having the output line number, in the conversion table as an output sequence number in the call, whereby the number of packets of the call which remain in the exchange is grasped on the basis of the input sequence number and output sequence number on the conversion table.

In accordance with the invention, the number of packets for each call in the exchange, the number of packets discarded in the exchange and a call which is most effective to avoid congestion, can be decided and congestion is controlled for each call on the basis of the thus decided factors to reduce delay in packet exchange and packet loss probability. For example, there are provided in the exchange a rerouting line (or detouring path) having a buffer function and control means for changing the contents of the conversion table when it is detected by looking up the conversion table that the number of packets for a specified output line which remain in the exchange exceeds a predetermined threshold, whereby input packets to be delivered to the specified output line can be so controlled as to be temporarily stored in the rerouting line, thereby reducing the packet loss probability. The present invention can readily provide, in addition to the above-described rerouting operation for avoidance of instantaneous congestion, means for insuring the packet sequence which is effective for switching a duplex packet switch between use and preparatory modes.

BRIEF DESCRIPTION OF THE DRAWINGS

FIGS. 13A, 13B and 14 are diagrams useful to explain the operation of the buffer memory;

FIGS. 16 to 18 are diagrams useful to explain tables 152 to 154 managed by the traffic management unit 3;

FIGS. 21A to 21C show a PAD diagram for explaining control operation of the traffic management unit.

DESCRIPTION OF THE PREFERRED EMBODIMENTS

As described previously, since the abovedescribed prior art system does not perform flow control of packet between one exchange and another or between a terminal device and the exchange, many packets are permitted to arrive at the exchange at a time and if the number of packets arriving at the exchange exceeds the number of packets which can be retained in the exchange, congestion occurs and an event that many packets in excess of a treatable number are forced to be discarded will occur at a certain probability.

In such an event, it is necessary that the status of congestion be accurately grasped by traffic control means provided in the exchange so as to perform control complying with the level of congestion. With the above-described prior art, the flow of packets belonging to respective calls passing through the input control circuits 1 (1a to 1m) or the output control circuits 5 (5a to 5n) can be measured but information necessary for grasping the congestion accurately, such as the number of packets present in the exchange or the number of packets discarded in the exchange can not be obtained.

Disadvantageously, in spite of the fact that congestion due to excessive traffic tends to occur in the exchange, the aforementioned prior art can not obtain accurate information necessary for congestion control. The present invention intends to solve the problem.

The invention will now be described by way of example with reference to the accompanying drawings.

Figure 1:
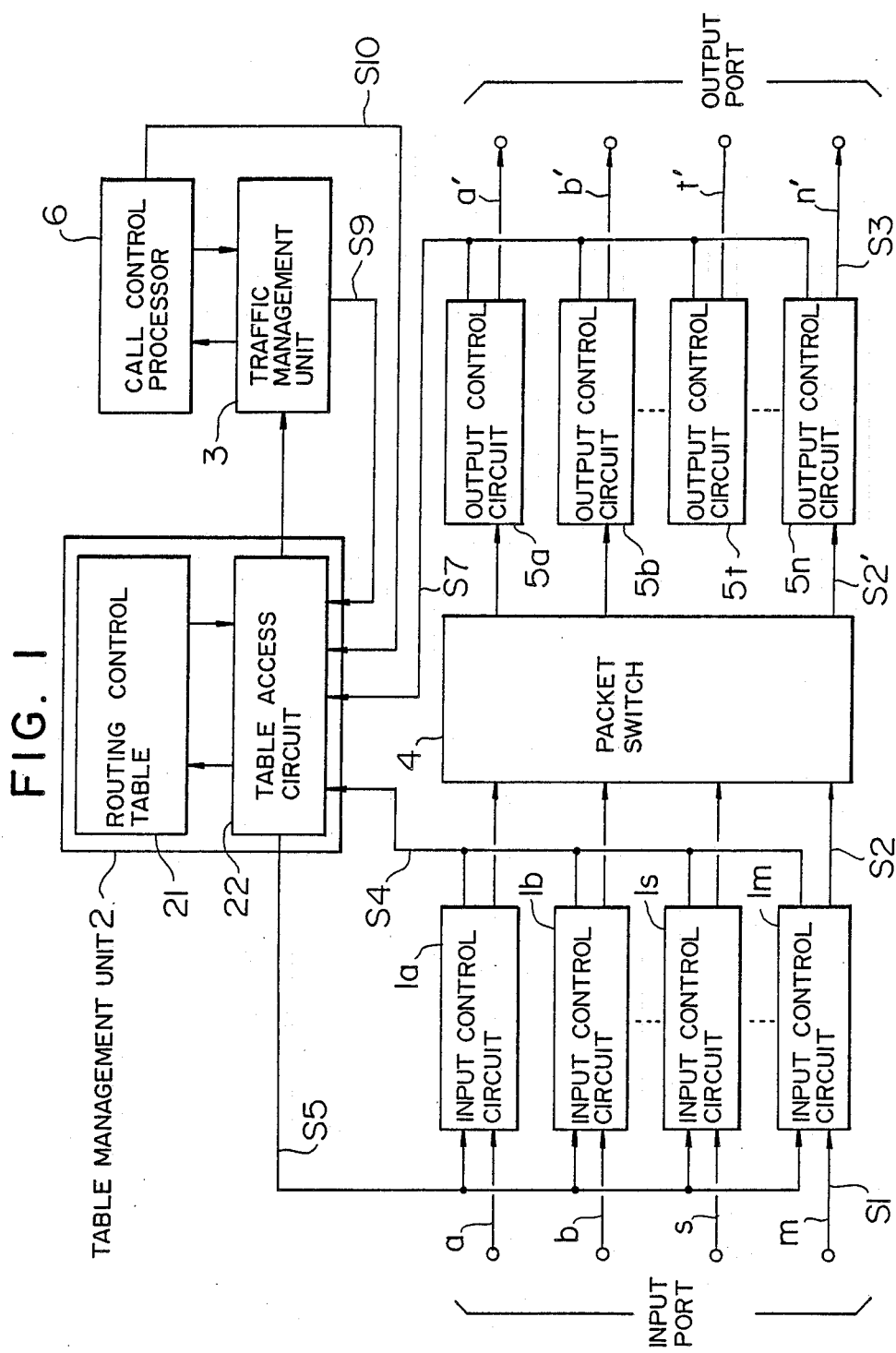
FIG. 1 is a block diagram illustrating an embodiment of a packet exchange system according to the invention.
Figure 2:
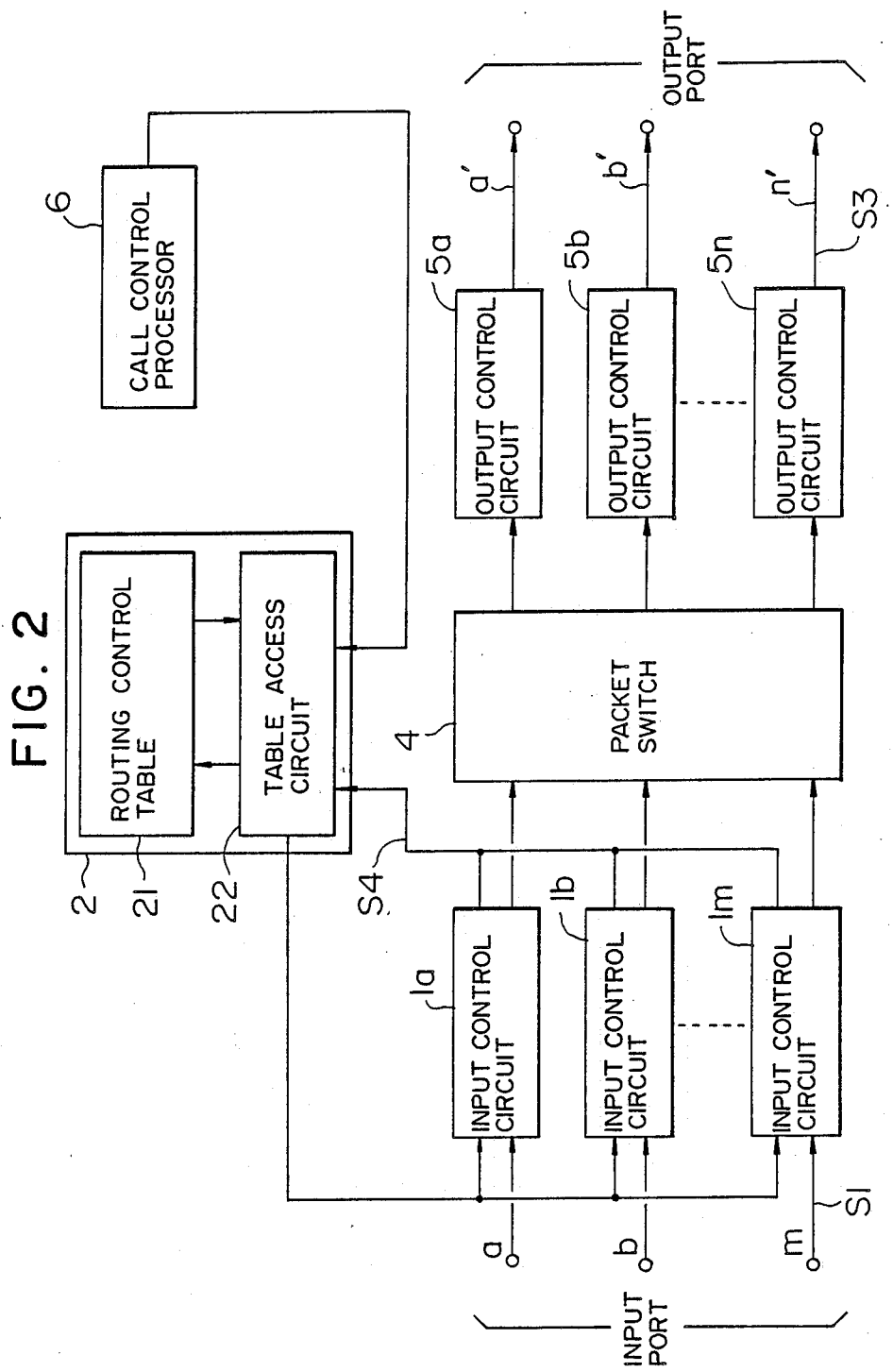
FIG. 2 is a block diagram illustrating a prior art packet exchange system.
Figure 3:
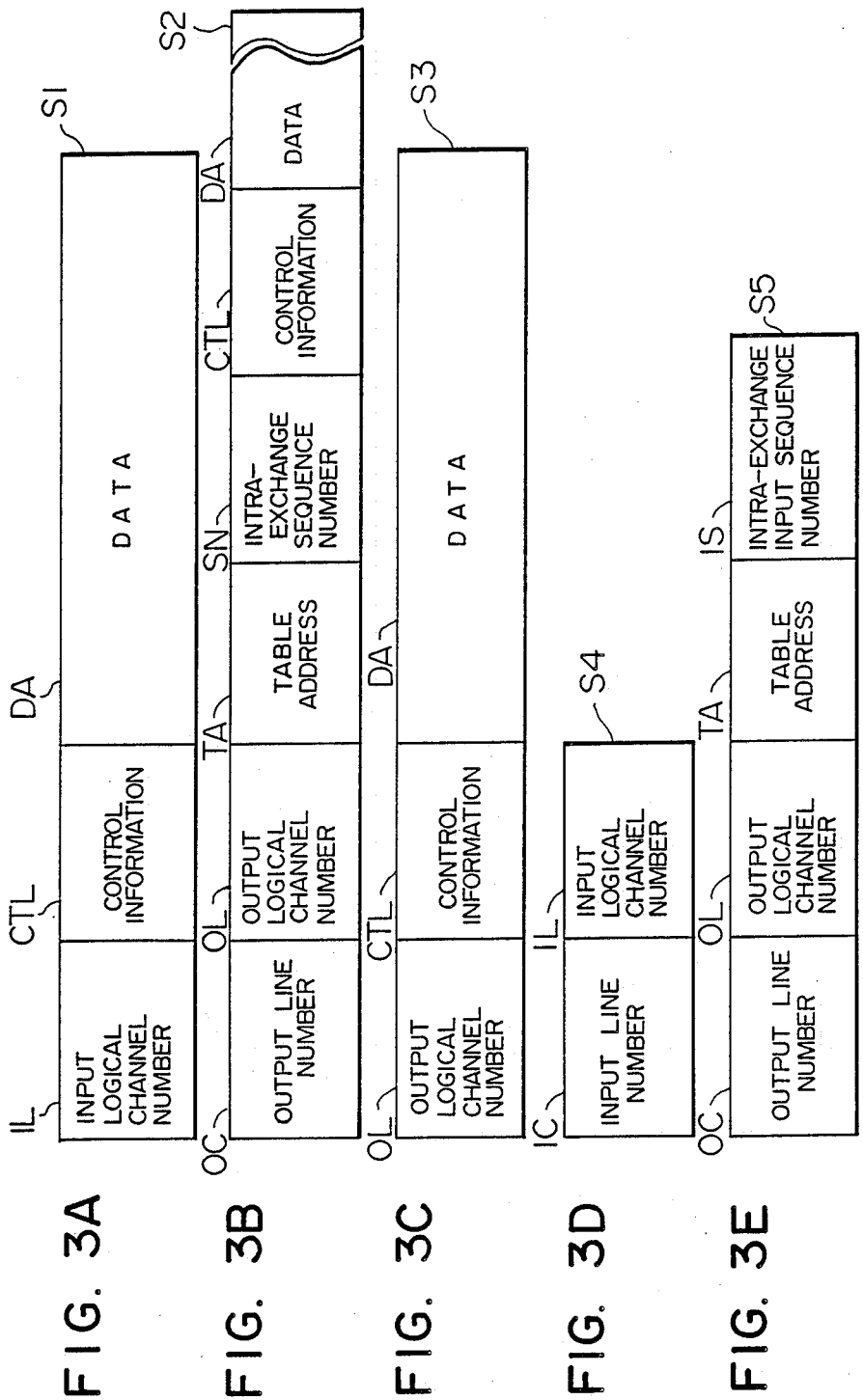
FIGS. 3A to 3E show formats of important signals appearing in the FIG. 1 exchange system.

Referring to FIG. 1, there is illustrated, in block form, an embodiment of a packet wxchange according to the invention. It is assumed that packets originating from a plurality of call sources and applied to the associated one of input lines a to m have each the same format as that for the prior art which includes the input logical channel number IL, control information CTL and data DA as shown in FIG. 3A. Depending on the type of packet, the control information CTL may be omitted as in the prior art. A packet S3 delivered to an output line a', b', .... or n' has also the same format as that for the prior art which includes the output logical channel number OL, control information CTL and data DA as shown in FIG. 3C.

Each of the input control circuits 1a to 1m shown in FIG. 1 is operable to read an input logical channel number IL from an input packet and add to data DA an output line number OC, an output logical channel number OL and an intra-exchange input sequence number IS standing for information indicative of the number of packets of each call inputted to the exchange. A table management unit 2 comprises a routing control table 21 and a table access circuit 22, the routing control table 21 being adapted to hold output line number OC, output logical channel number OL and intra-exchange input sequence number IS for each call which are set simultaneously with setting of a call as well as intra-exchange output sequence number OS standing for information indicative of the number of packets of each call which are delivered out of the exchange. A traffic management unit 3 responsive to the number of packets present in the exchange and the number of packets discarded in the exchange, both sent from the table management unit 2, evaluates congestion in the exchange and on the basis of results of evaluation, it sends a signal S9 to the table management unit 2 to instruct, for example, a change of the contents of the routing control table 21 included in the unit 2. During operation of a call control processor 6, the traffic management unit 3 also operates to control information exchange between the table management unit 2 and call control processor 6. A packet switch 4 responds to an output line number OC added to data DA of a packet sent from one of the input control circuits 1a to 1m to transfer the packet to one of output control circuits 5a to 5n. Each of the output control circuits 5a to 5n responds to a packet S2' sent from the packet switch 4 and having a format as shown in FIG. 3B to read therefrom an intra-exchange sequence number SN and a routing control table address TA, sends a signal S7 representative of the SN and TA to the table management unit 2, and converts the packet S2' into an output signal S3 of a format as shown in FIG. 3C which is delivered to one of the output lines a' to n'.

Individual components of the exchange operate as will be described below.

When a packet S1 of the format shown in FIG. 3A reaches the exchange, one of the input control circuits 1a to 1m receiving the packet S1 reads the input logical channel number IL, prepares the signal S4 of the format shown in FIG. 3D having the input logical channel number IL and input line number IC and sends the signal S4 to the table management unit 2.

Figure 4:
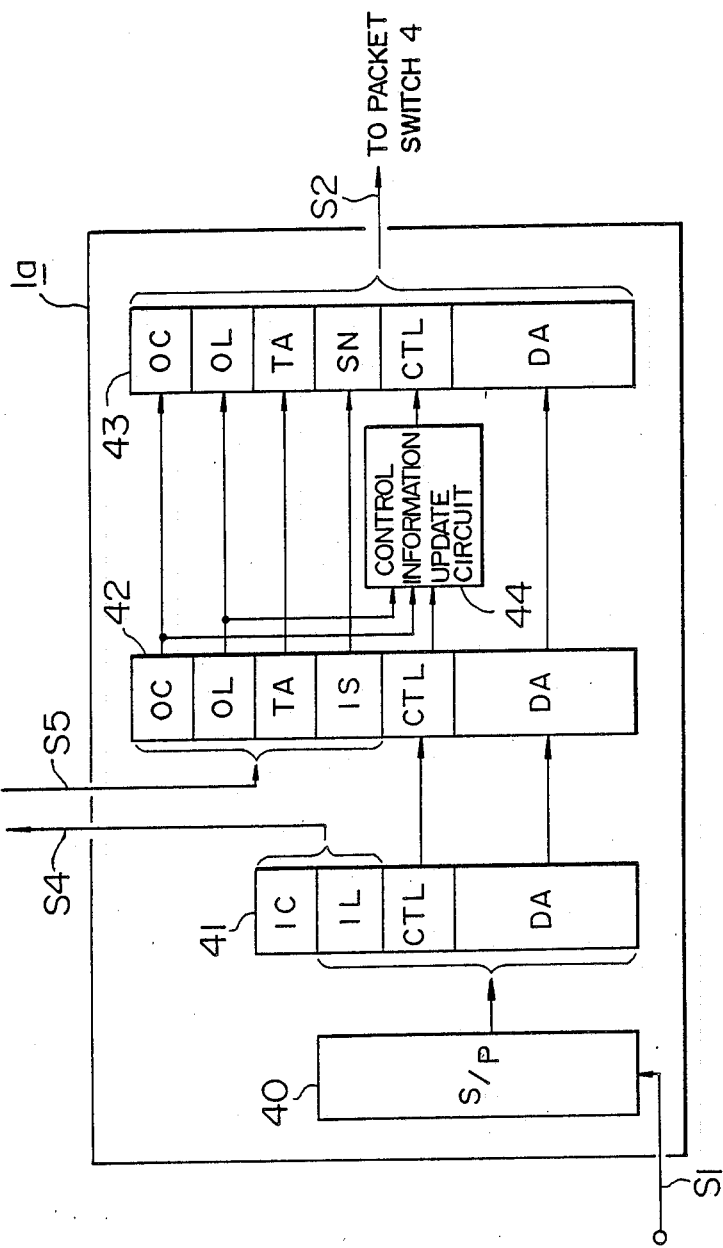
FIG. 4 is a block diagram showing the construction of an input control circuit 1 used in the FIG. 1 system.

Details of the input control circuit 1a are illustrated in FIG. 4. The packet S1 having fields inputted in series from the input multiplex line a is applied to a serial/parallel conversion circuit 40 at which it is converted into parallel data which are sent to a register 41. The register 41 has an IC field for holding a value of input line number precedently assigned to the input multiplex line a, and fields for respectively storing the IL, CTL and data DA supplied from the serial/parallel conversion circuit 40. Of the contents of the register 41, the IC and IL are sent as the signal S4 to the table management unit 2 but the CTL and DA are transferred to a register 42 at which they are retained until a signal S5 representative of values of OC, OL, TA and IS corresponding to the packet S1 is transmitted from the table management unit 2 to the register 42. When receiving the signal S5 from the table management unit 2, the register 42 transfers its contents to an output register 43. At that time, a control information update circuit 44 responsive to the OC, OL and CTL updates the value of CTL, so that a packet S2 having a format as shown in FIG. 3B is held in the output register 43. The packet S2 is then delivered to the packet switch 4. In this embodiment, the intra-exchange input sequence number added to the packet S2 in the input control circuit is discriminated from the intra-exchange input sequence number IS on the routing control table by being named intraexchange sequence number SN.

Figures 5, 6:
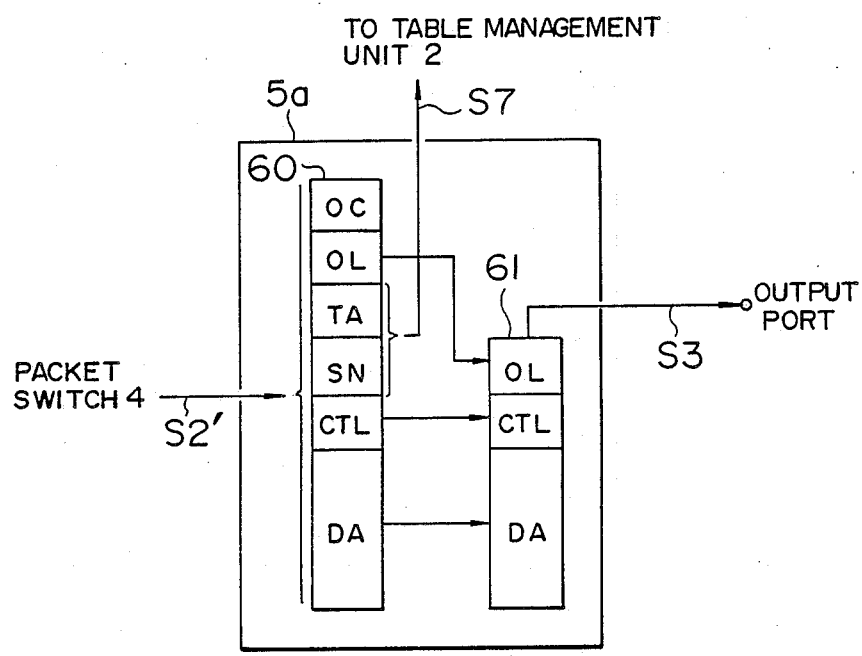
FIG. 5 is a diagram showing the structure of a routing control table 21.
FIG. 6 is a block diagram showing the construction of an output control circuit 5a used in the FIG. 1 system.

FIG. 5 shows the structure of the routing control table 21 included in the table management unit 2. As shown, the routing control table 21 includes output line number OC, output logical channel number OL, intra-exchange input sequence number IS and intra-exchange output sequence number OS. The intra-exchange input sequence number IS is set to an initial value "0" at the time that a call is set and it is incremented by one each time the routing control table 21 is informed of arrival of a packet belonging to the call and the value of the intra-exchange input sequence number IS is read out of the routing control table 21. In other words, the intra-exchange input sequence number IS indicates the number of packets belonging to a call which are inputted to the exchange after setting of the call. On the other hand, the intra-exchange output sequence number OS is set to an initial value "0" concurrently with setting of the call and it is rewritten to a value which is the intra-exchange sequence number SN of a packet belonging to the call plus 1 (one) each time the routing control table 21 is informed of delivery of the packet from the exchange. In other words, the intra-exchange output sequence number OS indicates, for each call, the last of the processed packets to indicates, of the packets inputted to the exchange, the number of packets which have already processed (i.e., "completion of process") and now outside the interior of the exchange ("absence in the interior of the exchange"). Here, "completion of process" or "absence in the interior of the exchange" means that a packet in question has in effect been delivered from the exchange to a corresponding output line or discarded in the interior of the exchange.

When values of the intra-exchange input sequence number IS and intra-exchange output sequence number OS exceed values which can be recorded in the hold area on the routing control table 21, a residue system which is modulo the maximum to be held may be employed to record those values. This permits that when the number of packets of a call present in the exchange is smaller than the maximum, the number of packets present in the exchange can be calculated through conversion using the intra-exchange input sequence number IS and intra-exchange output sequence number OS.

The input line number IC and input logical channel number IL transmitted, in the form of the signal S4, to the table management unit 2 are applied to an address conversion circuit 86 of table access circuit 22 to be detailed later with reference to FIG. 7 and then converted into an address TA on routing control table 21 where information concerning the call to which the packet belongs is held. The routing control table 21 is then accessed with this address so that the output line number OC, output logical channel number OL and intra-exchange input sequence number IS are read out of the table 21 and sent along with the table address TA, in the form of the signal S5 shown in FIG. 3E, to the input control circuit 1. After read-out operation, the intra-exchange input sequence number IS on the routing control table 21 is incremented by one. It is intended by the update of the input sequence number IS after completion of the read-out operation that the time for the packet to stay in the input control circuit 1 can be shortened to reduce signal delay occurring in the exchange.

The packet transmitted from one of the input control circuits 1a to 1m to the packet switch 4 is supplied to one of the output control circuits 5a to 5n which corresponds to the output line number OC. During this procedure, the packet may sometimes be discarded because of congestion in the packet switch 4.

FIG. 6 shows the construction of the output control circuit 5a. The packet S2' delivered out of the packet switch 4 is held in a register 60. Of the contents of the register 60, the TA and SN are sent as the signal S7 to the table management unit 2. The OL, CTL and DA are transferred to a parallel/serial conversion circuit 61 and then delivered in series, in the form of the signal S3 of the format shown in FIG. 3C, from associated output terminal of the switch to the associated output multiplex line.

When receiving the signal S7 representative of the table address TA and intra-exchange sequence number SN from the output control circuit 5a, the table access circuit 22 accesses the routing control table 21 on the basis of that table address TA to read the corresponding record of intra-exchange input sequence number IS and intra-exchange output sequence number OS. The intra-exchanage input sequence number IS indicates the number of packets belonging to the call which are inputted to the exchange during an interval of time which begins at setting of the call and ends at the time the present read operation occurs. On the other hand, the intraexchange output sequence number OS indicates the number of packets which have already been delivered out of the exchange or discarded and which are not present in the exchange. Accordingly, the difference between the intra-exchange input sequence number IS and intra-exchange output sequence number OS indicates the number of packets belonging to the call which are present in the exchange or which have not been determined to be discarded yet. Where the intra-exchange input sequence number IS and intra-exchange output sequence number OS are represented by a residue system which is modulo M, for the number of packets present in the exchange being smaller than M, the difference between the intra-exchange input sequence number IS and intra-exchange output sequence number OS indicates the number of packets of the call present in the exchange when the intra-exchange input sequence number IS is larger than or equal to the intra-exchange output sequence number OS, but when the intra-exchange input sequence number IS is smaller than the intra-exchange output sequence number OS, the difference (negative) plus M indicates the number of packets of the call present in the exchange.

In this embodiment, the value of the intraexchange output sequence number OS equals the number of packets which are actually delivered out of the exchange during an interval of time ranging from setting of the call to table accessing. In other words, the value of the OS equals the value of the intra-exchange sequence number SN possessed by a packet expected to reach the output circuit next under normal operation. Accordingly, when the intra-exchange sequence number SN possessed by the packet arriving at the output circuit does not coincide with the intra-exchange output sequence number OS, the difference between the two numbers indicates the number of packets belonging to the same call as that of the arriving packet, in which call one of packets preceding the arriving packet has been discarded in the packet switch 4 during an interval of time ranging from its arrival at the output control circuit 5 to the present instant.

Figure 7:
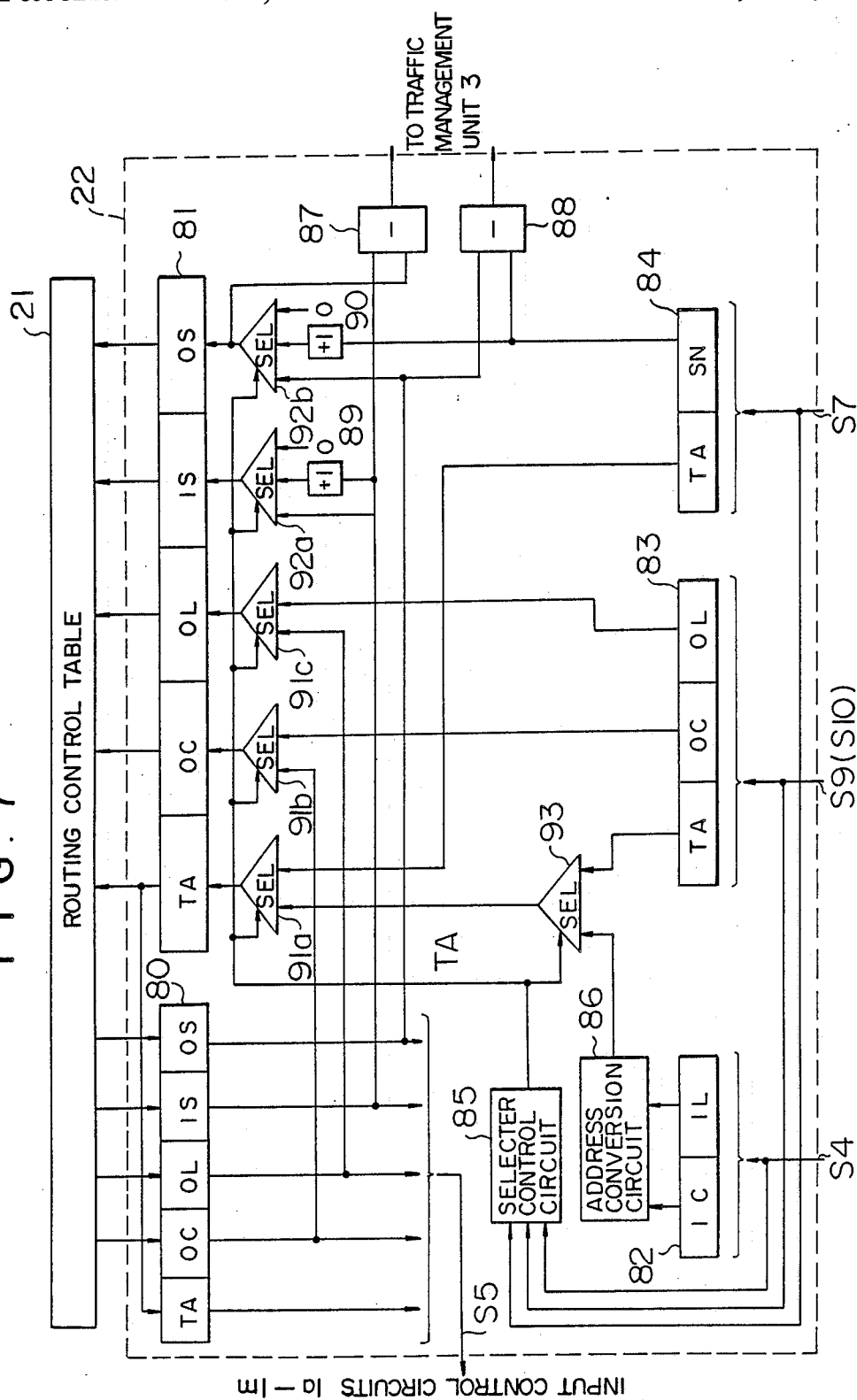
FIG. 7 is a block diagram showing the construction of a table access circuit 22 used in the FIG. 1 system.

FIG. 7 illustrates an embodiment of the table access circuit 22. Referring to FIG. 7, the table access circuit 22 comprises an input register 80 for holding data read out of the routing control circuit 21, an output register 81 coupled to the routing control table, a register 82 for receiving the signal S4 from each of the input control circuits 1a to 1m, a register 83 for receiving the signal S9 from the traffic management unit 3 and the signal S10 from the call control processor 6, a register 84 for receiving the signal S7 from each of the output control circuits 5a to 5n, a selector control circuit 85 responsive to the input signals to the registers 82 to 84 to control selectors (SEL) 91a to 91c, 92a, 92b and 93, the address conversion circuit 86, mentioned previously, responsive to the IC and IL from the register 82 to generate the address TA on the routing control table, a subtracter 87 for calculating the number of packets of a call which are present in the exchange, a subtracter 88 for calculating the number of packets of the call which are discarded in the exchange, and an adder 89 for updating the value of the OS. Each of the selectors 91a to 91c, 92a, 92b and 93 responsive to a control signal from the selector control circuit 85 selects and delivers one of a plurality of input signals.

When a signal S4 representative of input line number IC and input logical channel number IL from one of the input control circuits 1a to 1m is applied to the register 82, the input line number IC and input logical channel number IL once held in the register 82 are sent to the address conversion circuit 86 at which they are converted into an address TA on the routing control table 21. For example, the address conversion circuit 86 includes a content addressable memory or software using a hash function. The address TA is supplied to a TA field of the output register 81 through the selector 93 so that the contents stored at the address TA in the routing control table 21 is written in fields OC, OL, IS and OS of the register 80. A field TA of the register 80 is written with the value of the address TA. The contents of the register 80 is sent as signal S5 to the input control circuit which has issued the signal S4. Of the contents written in the register 80, the values of TA, OC, OL and OS remain unchanged but the value of IS is one incremented at the adder 89 and then set in the register 81 and written into the routing control table 21 from the register 81.

When the TA and SN are supplied to the register 84 from the corresponding one of the output control circuits 5a to 5n, the value of the TA is set in the TA field of the register 81 so that the contents stored at the address TA in the routing control table is written in the register 80. Concurrently therewith, the values of TA, OC, OL and IS are set in the register 81 without alteration but the value of SN is one incremented and then set in the OS field of the register 81 and written in the routing control table 21. Then, the subtracter 87 calculates a difference between the IS and OS and sends the calculated difference, indicative of the number of packets of the call which are present in the exchange, to the traffic management unit 3. On the other hand, the subtracter 88 calculates a difference between the SN and OS and sends the calculated difference, indicative of the number of packets of the call which have been discarded, to the traffic management unit 3.

When the signal S9 from the traffic management unit 3 or the signal S10 from the call control processor 6 is applied to the register 83, the TA, OC and OL are then written in the fields TA, OC and OL of the register 81, respectively, with the fields IS and OS thereof initialized to "0", and the contents of the register 81 is written at the address TA in the routing control table. This ensures setting of the call in the routing control table and change of its contents.

The traffic management unit 3 collects from the table management unit 2 the number of packets belonging to the call which are present in the exchange and the number of packets also belonging to the call which are discarded in the exchange and it decides whether congestion is occurring. When congestion is determined to be present, the unit 3 performs control for avoidance or mitigation of the congestion, including changing exchange rules (routing) by the packet switch 4, changing the routing control table, changing call acknowledgement criteria, giving information to neighboring exchanges and giving information to transmitting terminals.

Figure 8:
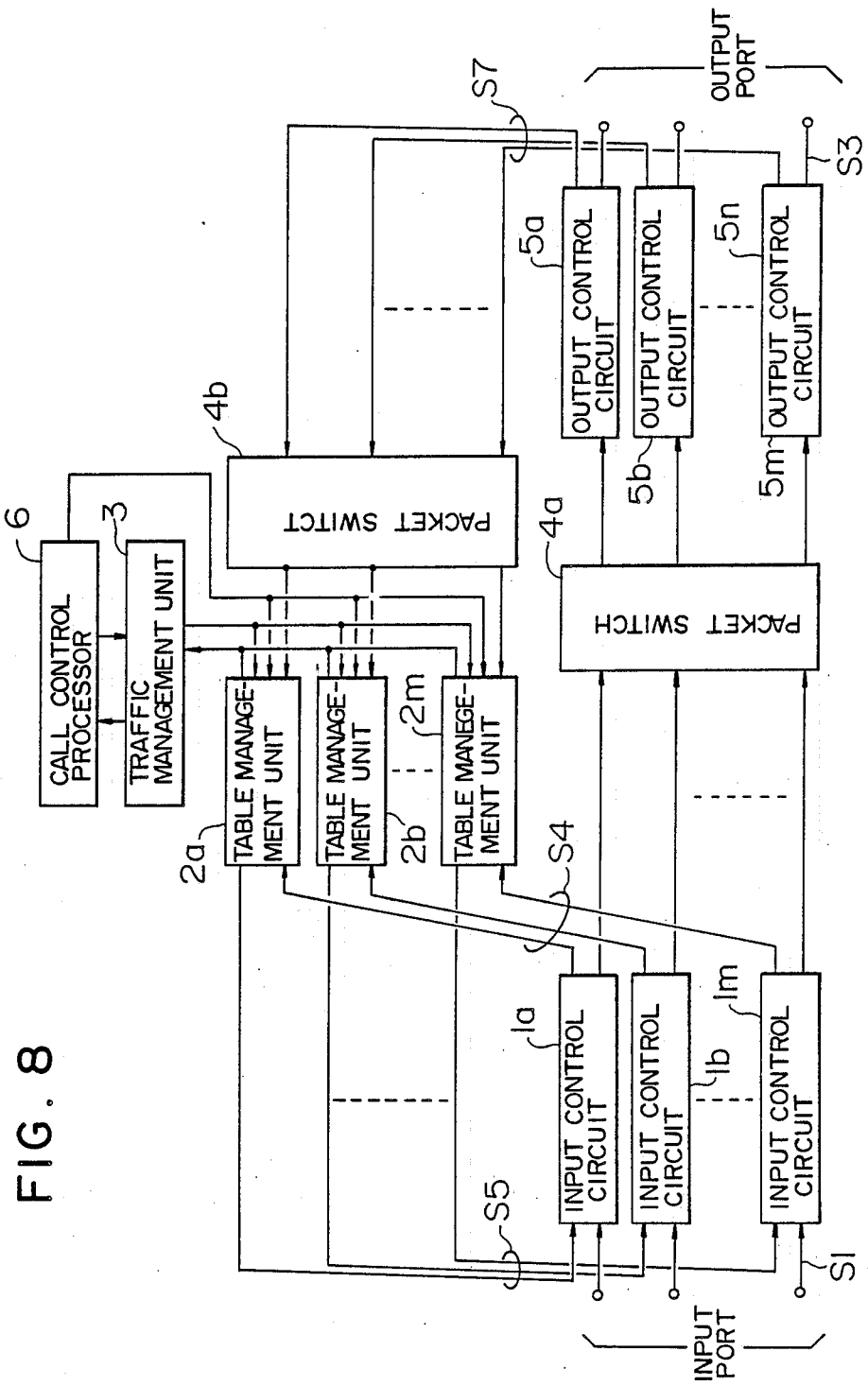
FIG. 8 is a block diagram illustrating another embodiment of the packet exchange system according to the invention.

The FIG. 1 embodiment described so far uses the single table management unit 2 but the invention may be applied to a system comprising a plurality of table management units. FIG. 8 shows another embodiment of the exchange system to this effect wherein a plurality of table management units 2a to 2m are provided in association with input control circuits 1a to 1m, whereby individual table management units handle packets applied to the associated input control circuit. The FIG. 8 embodiment may be modified so that each of the plurality of table management units manages a plurality of input control circuits. Referring to FIG. 8, the system illustrated therein operates in essentially the same way as the FIG. 1 embodiment as far as update by the input control circuit of the header of a packet inputted to the exchange and delivery of the packet to the output control circuit through a packet switch 4a are concerned. Excepting the above, in accordance with the present embodiment, a signal S7 delivered out of an output control circuit and including TA and SN is supplied to a packet switch 4b which in turn responds to the value of the TA to relay the data to the corresponding table management unit. A traffic management unit 3 and a call control processor 6 manage the plurality of table management units 2a to 2m collectively. With this construction, distribution of load to the table management units can be realized and speed up of processing can be insured.

Figure 9:
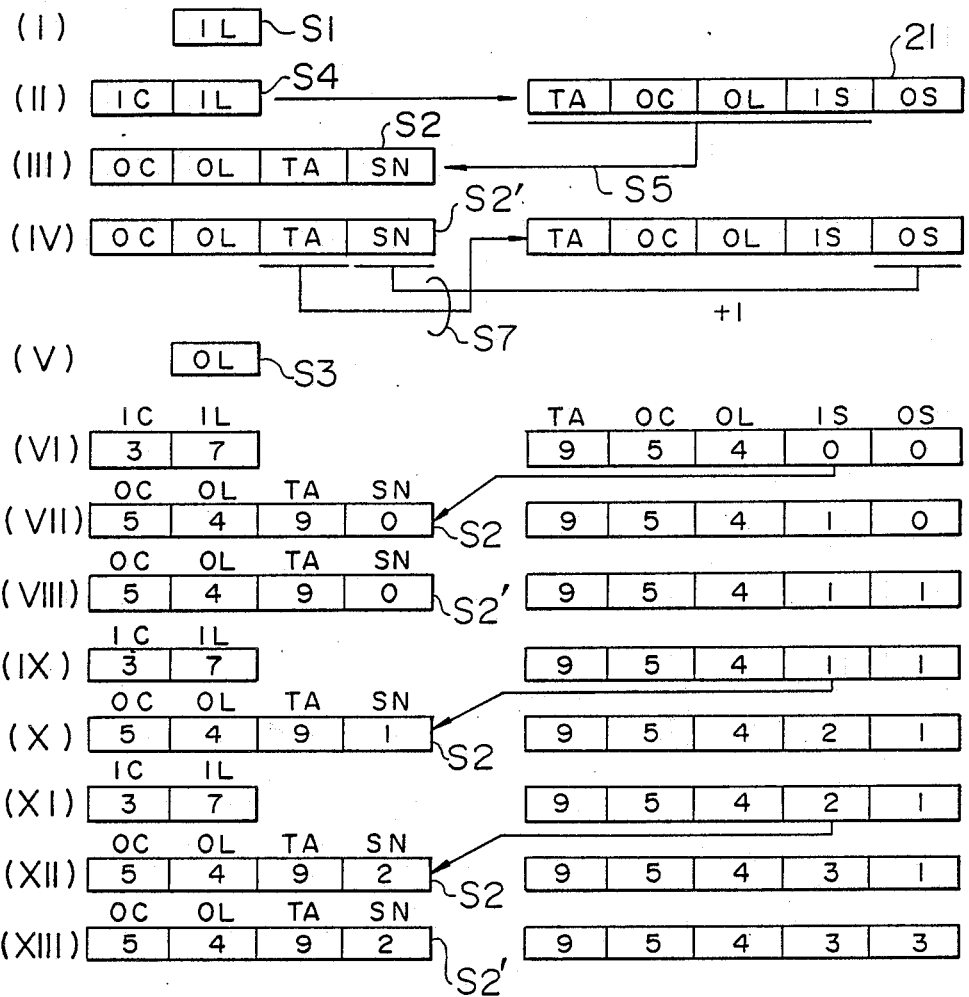
FIG. 9 is a diagram useful in explaining the operation of the embodiments of FIGS. 1 and 8.

FIG. 9 shows an example of time series operation of the high speed packet exchange of the foregoing embodiments in accordance with steps (i) to (xiii). In FIG. 9, the contents of the header information transferred among the input control circuit 1, output control circuit 5 and table management unit 2 is indicated on the left, and the contents of the routing control table is indicated on the right.

When a packet having a data field DA not shown and an input logical channel number IL is inputted to any one of the input control circuits (step i), the IL and an input line number IC assigned to the input control circuit in question are sent to the table management unit 2 and converted into an address TA on the routing control circuit 21 so that OC, OL and IS and the address TA are read out of the routing control table and sent to the input control circuit which in turn produces a packet S2 (steps ii to iii). The packet S2 is then supplied to the switch 4 and delivered therefrom as a packet S2' to an output control circuit designated by the OC. Upon arrival of this packet at the output control circuit, values of the TA and SN are sent from the output control circuit to the table management unit so that the contents of record OS field stored at the address TA in the routing control table is rewritten to a value which is the SN plus one (step iv). Then, a packet S3 having the output logical channel number OL is delivered to the output line (step v).

As an example, it is now assumed that an input call having IC=3 and IL=7 is scheduled to be converted into an output call having OC=5 and OL=4 and that information record necessary for the conversion is stored at an address "9" on the routing control table. When the first packet of the call in question arrives at the exchange, the routing control table has its contents as indicated at step vi. At that time, header information represented by IS=0 is sent from the table management unit 2 to the input control circuit and on the other hand, the IS of the routing control table takes "1" (step vii). The difference between the values of IS and OS is now one, which indicates the number of packets belonging to the call and present in the exchange. If no following packet of the call arrive at the exchange before the initial packet is delivered to the output line, the routing control table has its contents as indicated at step viii at the time of delivery of the initial packet. Thereafter, if successive two packets belonging to the call of interest reach the exchange (steps ix and xi), the routing control table has its contents as indicated at step x and at step xii, with the result that [IS]−[OS]=2 stands at the time of step xii, indicating that two packets exist in the network. Given now that the packet inputted in step ix and represented by SN=1 is discarded, the routing control table takes information record as indicated at step xii at the time of delivery of the packet represented by SN=2 and there results the difference between the SN and OS being one, proving that one packet has been discarded. After completion of delivery of the packet represented by SN=2, the contents of the routing control table is updated as indicated at step xiii, indicating that no packet belonging to the call of interest exists in the exchange.

In accordance with the invention, the value of the output sequence number OS stored in the routing control table is updated each time a packet of a call of interest is delivered out of the exchange, particularly, on the basis of the value of the sequence number IS (=SN) determined when that packet is inputted to the exchange. Therefore, by comparing the OS value with a value of the input sequence number IS stored in the routing control table which is to be assigned to a packet inputted next, the number of packets belonging to a call of interest which stay in the exchange can be grasped accurately regardless of the presence or absence of packets which have been discarded in the exchange.

Figure 10:
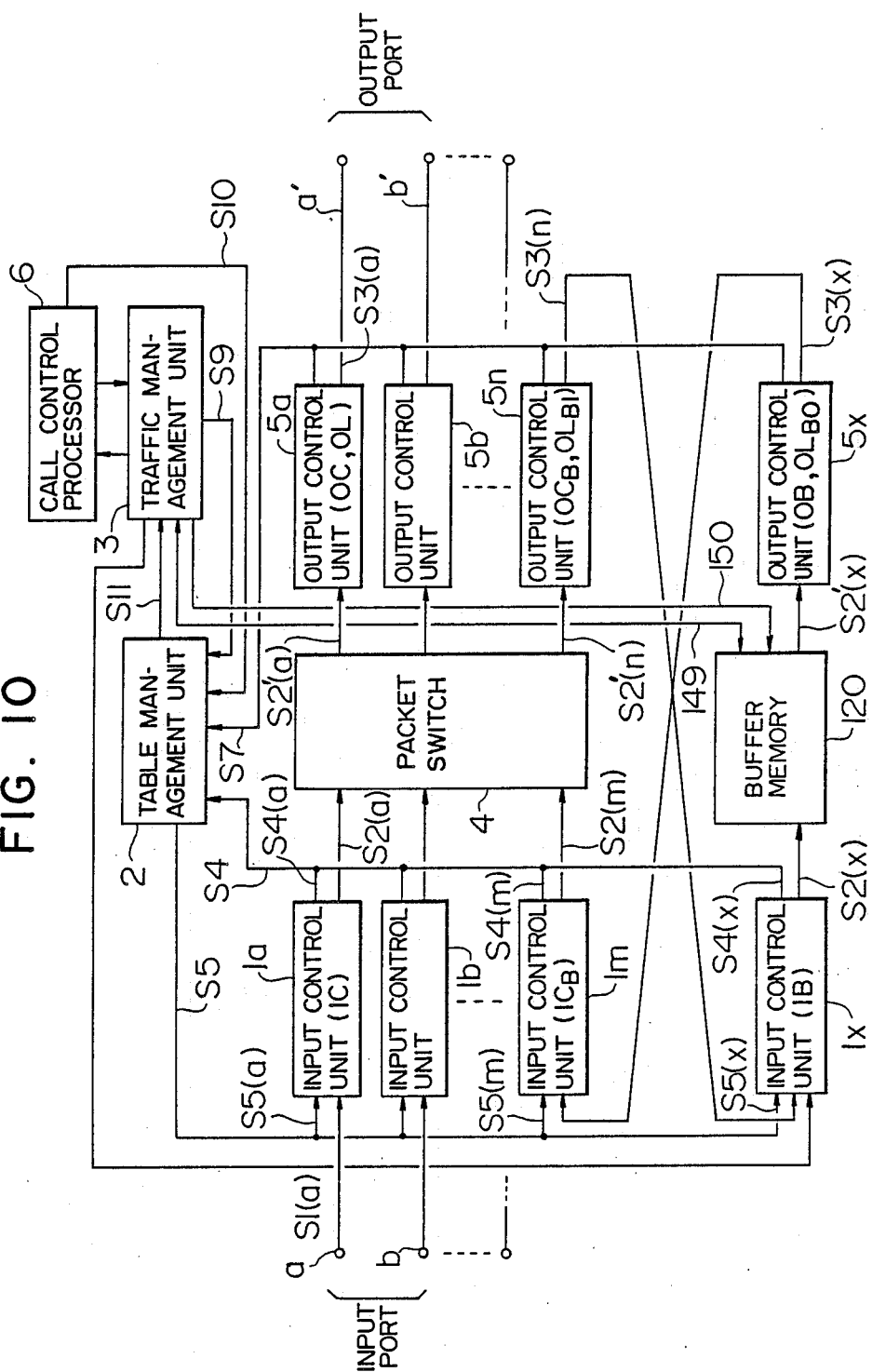
FIG. 10 is a block diagram illustrating a further embodiment of the packet exchange system according to the invention.

Referring to FIG. 10, a further embodiment of the packet exchange system will be described which additionally comprises a rerouting circuit with buffer memory to reduce the number of lost or discarded packets even when congestion occurs in the packet switch.

In this embodiment, the input control circuits 1a to 1m, output control circuits 5a to 5n, table management unit 2, traffic management unit 3, packet switch 4 and call control processor 6 are the same as those of the FIG. 1 embodiment.

In particular, this embodiment features that a rerouting circuit comprising a buffer memory 120, an input control circuit 1x and an output control circuit 5x which are cooperative with the buffer memory 120 is connected between the output control circuit 5n and input control circuit 1m.

To describe the operation of this embodiment as constructed above, it is assumed that there occurs congestion in which output packets are instantaneously concentrated in a specified output control circuit, for example, circuit 5a. The traffic management unit 3 is operating to check individual information records on the routing control table 21 and monitor, in respect of each output control circuit, the difference between the IS and OS of a call connection using the information record. When the traffic management unit 3 detects that the number of packets expected to be delivered to the output control circuit 5a exceeds a certain prescribed value (first threshold) in the packet switch 4, it rewrites the routing control table so that a part of the call connection expected to pass through the output control circuit 5a, for example, an information record on the routing control table for a call of the type which can accept a change in exchange delay may pass through the output control circuit 5n. This connection change causes a part of packets directed to the output control circuit 5a to branch to the output control circuit 5n so as to be sequentially stored in the buffer memory 120 through the input control circuit 1x and placed in condition for waiting for delivery.

Thereafter, when the traffic management unit 3 monitoring the packet traffic directed to the output control circuit 5a detects that packets belonging to the call which precede the rerouting are all delivered and that the number of packets in waiting condition in the packet switch 4 is so decreased as to fall below a prescribed value (second threshold) which conditions release of packets in the buffer memory 120 from the waiting for delivery, it connects the input control circuit 1m to the output control circuit 5a, thereby permitting the packets previously stored in the buffer memory 120 to be delivered to the output control circuit 5a through the output control circuit 5x, input control circuit 1m and packet switch 4. By temporarily rerouting part of packets in this manner, the loss of packets due to a queue in packet switch 4 being in excess of a limited length can be prevented when congestion occurrs in which traffic is instantaneously concentrated in part of the output port of the packet switch 4. Even with the temporary rerouting operation incorporated, the packet exchange system is required to guarantee that packets of each call shall be delivered out of the exchange system in the same sequence as input sequence. In accordance with this embodiment, the requisite sequence can be guaranteed by managing the intra-exchange input sequence number IS, intra-exchange sequence number SN and intra-exchange output sequence number OS as will be described below.

For convenience of explanation, it is now assumed that the input control circuits 1a, 1m and 1x are associated with input line numbers $I_c$, $I_{cB}$ and $I_B$, respectively, the output input line numbers for the output control circuits 5a, 5n and 5x and corresponding output logical channel numbers are defined by (OC, OL), ($OC_B$, $OL_{BI}$) and (OB, $OL_{BO}$), respectively, and the input and output signals designated by S1(a)–S5(x) are applied to the input control circuits 1a, 1b ... 1m and 1x, respectively, as shown in FIG. 10.

Figure 11:
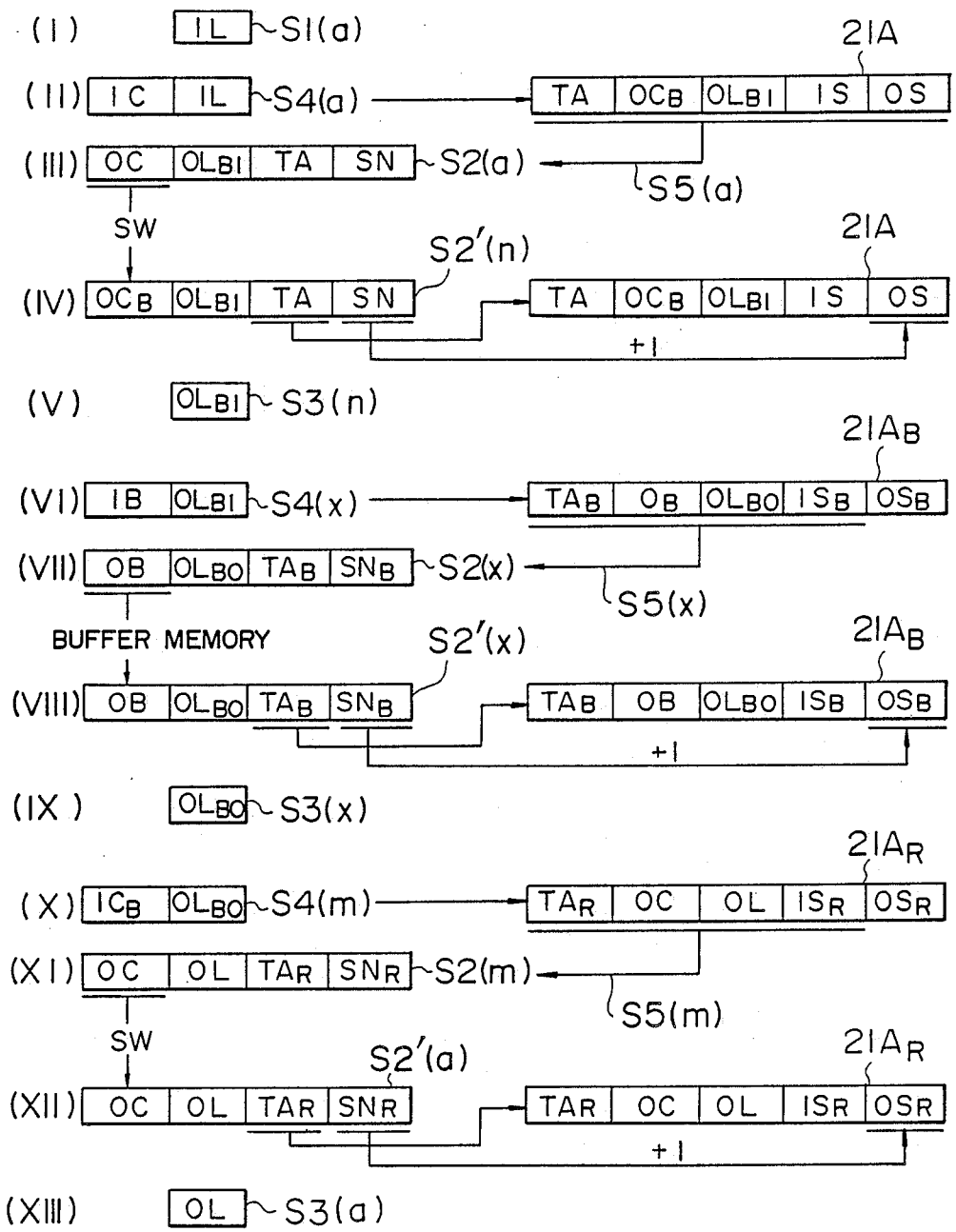
FIG. 11 is a diagram useful in explaining the operation of the FIG. 10 embodiment.

Under the application of a packet S1(a) to input control circuit 1a which is scheduled to be destined for the output control circuit 5a (step i in FIG. 11), when full occupation of the output control circuit 5a by the other traffic occurs and the above input packet is required to be temporarily stored in the buffer memory 120, the scheduled value (OC, OL) of the output line number and output logical channel number in a record 21A at an address TA on the routing control table which is accessed by the table access circuit 22 responsive to an output signal S4(a) from the input control circuit 1a is changed to the value ($OC_B$, $OL_{BI}$) as shown at step ii in FIG. 11 in accordance with the present embodiment. As a result of this change of value, the header of a packet S2(a) sent from the input control circuit 1a to the switch 4 is assigned with the output line number $OC_B$ and output logical channel number $OL_{BI}$ destined for the output control circuit 5n (step iii), and this packet is supplied to the output control circuit 5n through the packet switch 4 (step iv) and then delivered out of the output control circuit 5n in the form of a packet S3(n) having the logical channel number $OL_{BI}$ (step v). The output packet S3(n) of the output control circuit 5n is applied to the input control circuit 1x.

A record on the routing control table to be accessed when the input control circuit 1x receives the packet S3(n), that is, a record $21A_B$ determined by a combination of the input line number IB and the logical channel number $OL_{BI}$ possessed by the packet S3(n) inputted to the circuit 1x has its contents as shown at step vi in FIG. 11. When the table management unit responsive to a signal S4(x) from the input control circuit 1x delivers data represented by the signal S5(x), the input control circuit 1x delivers a packet S2(x) having its contents as shown at step vii in FIG. 11. This packet is temporarily stored in the buffer memory 120 and thereafter read out of the memory 120 in response to a command from the traffic management unit 3 when congestion in output control disappears, thereby providing a signal S2'(x) which is applied to the output control circuit 5x (step viii). This causes the output control circuit 5x to deliver a packet S3(x) having at its header the logical channel number $OL_{BO}$ to the input control circuit 1m (step ix).

Before reading of the packet from the buffer memory 120, the traffic management unit 3 operates to set the contents as shown at step X in FIG. 11 in a record $21A_R$ at an address $TA_R$ on control table determined by the input line number $IC_B$ and logical channel number $OL_{BO}$ for the input control circuit 1m. In other words, the output line number and output logical channel number of the record $21A_R$ are set with OC and OL which are originally scheduled to be held by the record 21A. The input control circuit 1m responsive to the packet S3(x) produces a signal S4(m) to which the table management unit responds to look up the record $21A_R$ (step x), so that a packet S2(m) having at its header the OC and OL is delivered from the circuit 1m to the switch 4 (step xi). The packet switch 4 relays the input packet S2(m) to the output control circuit 5a (step xii) which in turn delivers a packet S3(a) having the logical channel number OL.

In the present embodiment, the output or input logical channel number corresponding to the $OC_B$ and IB is made to be $OLB_I$ and the output or input logical channel number corresponding to the OB and $IC_B$ is made to be $OL_{BO}$. But if, for example, the output control circuit 5n of the packet switch 4 does not correspond to the input control circuit 1x of the buffer memory in one to one correspondence relationship and the output control circuit 5x of the buffer memory does not also correspond to the input control circuit 1m of the packet switch in one to one correspondence relationship, logical channel members different from the $OL_{BI}$ and $OL_{BO}$ may be assigned in accordance with individual calls respectively assigned to the IB and $IC_B$.

If, in the FIG. 10 packet exchange system having the rerouting circuit, the call connection once rerouted is returned by changing the connection to the original connection prevailing before the rerouting with packets belonging to the call left behind in the buffer memory 120, there is a possibility that the packets remaining in the rerouting circuit will reach the output control circuit of the packet switch later than the following packet belonging to the same call and which has been inputted to the packet switch 4 after the change of connection. This inconvenience can be prevented by effecting the change of connection after coincidence of the IS with the OS, coincidence of the $IS_B$ with the $OS_B$ and coincidence of the $IS_R$ with the $OS_R$ have been confirmed in connection with steps in FIG. 11. Since no packets belonging to that call connection remain in the switch and buffer memory standing for constitutional components of the rerouting circuit at the time that the above condition is satisfied, the disturbance of sequence of packet can be avoided.

Figure 12:
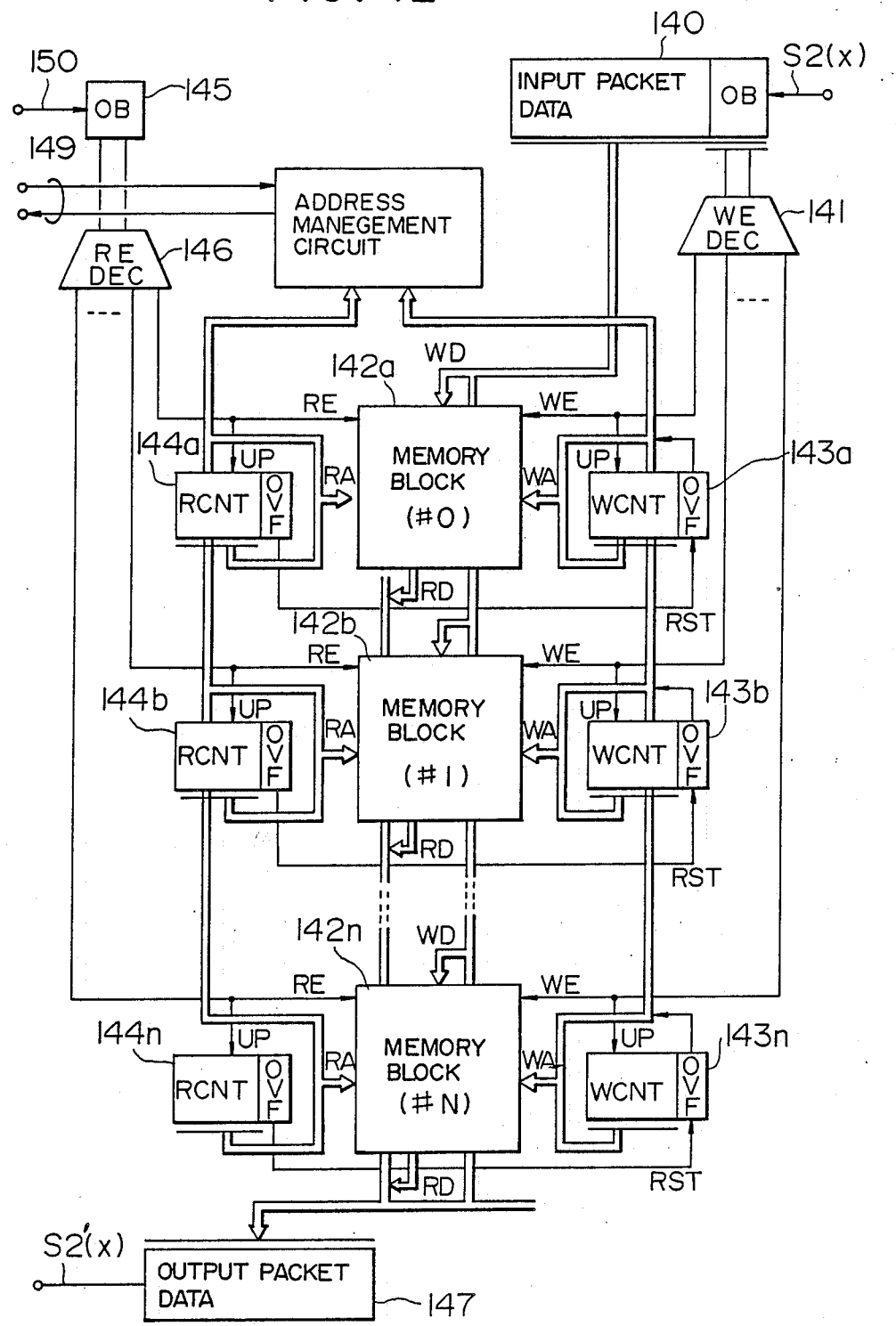
FIG. 12 is a block diagram illustrating an embodiment of a buffer memory 120 in the FIG. 10 embodiment.

An example of the construction and operation of the buffer memory 120 shown in FIG. 10 will be described with reference to FIGS. 12 and 13.

An input packet to the buffer memory is applied to an input register 140 through the buffer input control circuit 1x. The buffer memory is divided into memory blocks 142a to 142n corresponding to the output ports of the packet exchange system, and the input packet data written in the input register 140 and an OB are written in any one of the memory blocks 142a to 142n. The output line number OB contained in the input packet is decoded by a write enable decoder (WEDEC) 141 to provide a selection signal WE and one of the memory blocks which should be written with the contents of the input register 140 is selected by the selection signal WE. The output control circuit (5x in FIG. 10) is a single circuit in terms of hardware but logically, it requires a plurality of output line numbers through which packets destined for a plurality of output lines pass and therefore is constructed to have the plurality of output line numbers. In this embodiment, the output line number OB of the output control circuit 5x coincides with the output line number OC of the exchange system but more generally, the output control circuit 5x may be assigned with an output line number which can make correspondence to the output line number OC.

In order to read the buffer memory, the traffic management unit 3 operative to monitor the output traffic waiting status in respect of the individual output circuits of the packet exchange system commands reading of a packet destined for an output port from which congestion disappears and to this end, the unit 3 writes the output line number OB in a register 145 through a signal line 150. The output line number OB is then decoded by a read enable decoder (REDEC) 146 to provide a signal RE which enables any one of the memory blocks 142a to 142n to be ready for reading. Data RD read out of the enabled memory block is delivered to the buffer output control circuit 5x through an output register 147.

The memory blocks are respectively coupled with write address counters (WCNT's) 143a to 143n and with read address counters (RCNT's) 144a to 144n, and an address WA for writing data in each memory block is designated by the associated write address counter and an address RA for reading data from each memory block is designated by the associated read address counter. The addresses WA and RA are monitored by an address management circuit 148 as will be explained later in connection with FIG. 13, and address management information 149 indicative of the status of the buffer memory is informed from the circuit 148 to the traffic management unit 3 so as to be utilized for packet traffic control throughout the whole of the packet exchange system.

Write address counters 143a to 143n and read address counters 144a to 144n are all cleared to zero by initialization (reset control lines are not shown) and each time a packet is written or read, the corresponding counter is counted up by a predetermined number of addresses corresponding to a data length.

When the address value of the counter reaches the maximum address value of the memory block, a counter overflow bit (OVF) is set in the counter and the address value returns to zero. Even after set with the OVF, the write counter still continues counting up. When the read counter overflow hit (OVF) is set, resetting the overflow bits of the write counter and the read counter, the read counter continues counting up.

In accordance with the count value and the status of the overflow bit in the write counter and read counter, the address management circuit 148 can grasp the use condition of the memory block which is indicated by either FIG. 13A or FIG. 13B. In these figures, as counting of the counter proceeds, the read or write address moves in the direction indicated by arrow X.

The status of the memory block is decided on the basis of the write counter value (WCNT), read counter value (RCNT) and overflow of each counter to provide results as shown in FIG. 14. In FIG. 14, (WCNT)c and (RCNT)c represent complements of the maximum values of the write counter and read counter.

The address management circuit 148 informs the traffic management unit 3 of the use condition of the memory block in order for the traffic management unit to perform proper traffic management throughout the whole of the packet exchange system.

The traffic management unit 3 in the FIG. 10 embodiment carries out decision of congestion and rerouting processing as will be described below with reference to FIGS. 15 to 20 and FIGS. 21A to 21C.

Figure 15:
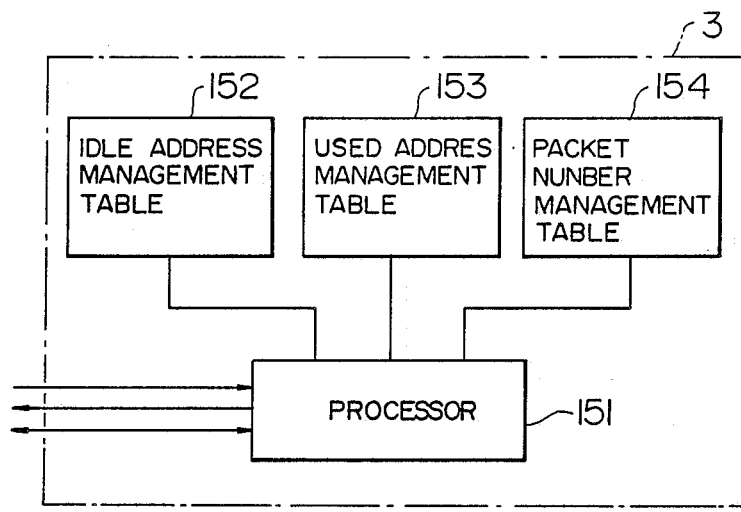
FIG. 15 is a block diagram illustrating an embodiment of a traffic management unit 3 used in the FIG. 10 embodiment.

FIG. 15 illustrates an embodiment of the traffic management unit 3. An idle address management table 152 is a table for registering an idle address which is on the routing control table and it is used to manage a call to be rerouted. A used address management table 153 is for managing an address TA which is on routing control table 21 and which is presently used and the status of the call. A packet number management table 154 is for storing the number of packets which are present in the exchange in respect of individual output lines. A processor 151 manipulates the idle address management table 152, used address management table 153 and packet number management table 154 and performs exchange of information between the table management unit 2 and call control processor 6.

Figure 16:
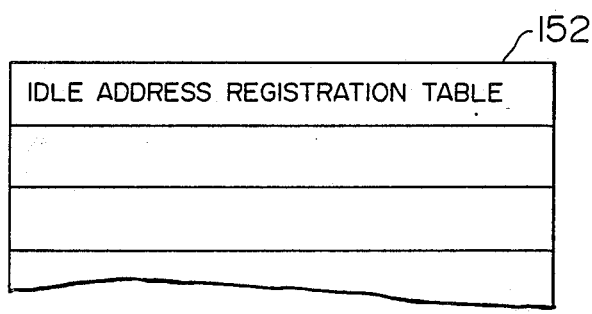

FIG. 16 show the structure of the idle address management table 152. Respective line sections of the table correspond to respective input control circuits 1a . . . 1m and 1x and an address which is on the routing control table and which is not used presently, i.e., an idle address is registered in each area. When congestion occurs, the processor 151 takes out an idle address from an area on idle address management table 152 corresponding to an input control circuit through which a call to be rerouted passes and registers the idle address in a routing control table 21 for rerouted call (including tables 21b, 21c and 21d) to be described later and at the same time gives address distribution information to be described later.

FIG. 17 shows the structure of the used address management table 153. Respective line sections of the table correspond to the call inputted to respective input control circuits. Table address TA indicates an address on the routing control table at which a call corresponding to the area in question is registered, output line number OC indicates an output line number to which packets belonging to the packet are delivered, and rerouted call flag FLC is a flag indicating that the call is a rerouted call. This flag is set to "ON" after the execution of rerouting and is then set to "OFF" when the rerouting circuit is cancelled and the original routing recovers. Output-permitted call flag FOP is a flag for conserving sequence of packets belonging to a call subject to the execution of rerouting and is set to "ON" when packets belonging to the call which are inputted before rerouting are all delivered.

FIG. 18 shows the structure of the packet number management table 154. Respective line sections of the table correspond to respective output lines. Packet number NOP indicative of the number of packets remaining in the exchange provides an area in which the number (NCP) of packets of each call collected in the processor 151 and totalled in respect of individual output lines is stored. Rerouting line flag FLO indicates that the output line in question is subjected to rerouting and is set to "ON" when the packet number NOP exceeds a predetermined first threshold (T1). Output-permitted line flag FOE indicates that the line in question is a line permitted to receive the output signal from the buffer memory 120 after the establishment of rerouting. When rerouting is executed for the output line designated by the "ON" rerouting line flag FLO to temporarily store packets in the buffer memory, the number of packets NOP on that output line falls below a predetermined third threshold (T3) smaller than T1. At that time, the output-permitted line flag FOE is set to "ON". Rerouting writing call table address registration area RWL is an area in which there is stored a table address of that one of calls destined for an output line, the number (NCP) of packets belonging to which and present in the exchange exceeds a predetermined second threshould (T2) but has not been subjected to the rerouting processing yet. Output-permitted call table address registration area RPT is an area in which there is stored a table address of one of rerouted calls destined for an output line for which the output-permitted flag FOP is set to "ON". Output not-permitted call table address registration area RNT is an area in which there is stored a table address of one of rerouted calls destined for that output line for which the output-permitted flag is not set to "ON".

Figure 19:
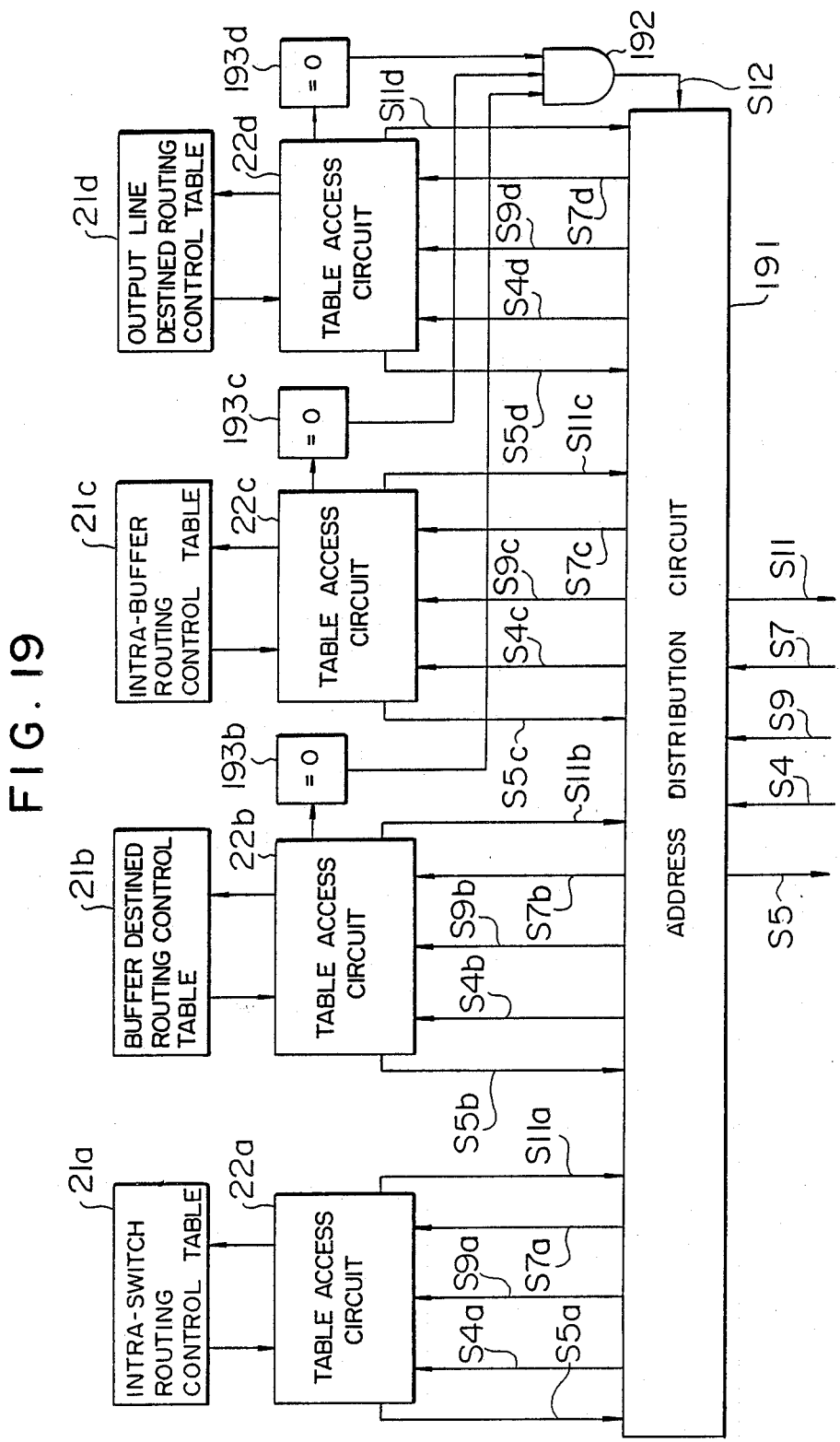
FIG. 19 is a block diagram illustrating an embodiment of a table management unit 2 used in the FIG. 10 embodiment.

FIG. 19 illustrates the construction of the table management unit 2 used in the FIG. 10 embodiment. An intra-switch routing control table 21a is for managing a call not subject to rerouting and is managed by a table access circuit 22a. A buffer destined routing control table 21b is for managing the status of a route between the input control circuit through which a call subject to rerouting passes and the output control circuit 5n and is managed by a table access circuit 22b. An intra-buffer routing control table 21d is for managing the status of the call subjected to rerouting in the buffer memory 120 and is managed by a table access circuit 22c. An output line destined routing control table 21d, similar to FIG. 5, for managing the status of a route between the input control circuit 1m and the destined output control circuit and is managed by a table access circuit 22d. Each of the paired 21a and 22a, 21b and 22b, 21c and 22c, and 21d and 22d resembles FIG. 7 in circuit construction. Comparators 193b, 193c and 193d are informed of values of the number (NCP) of packets of a call belonging to the routing circuit which are present at various routes in the switch from the table access circuits 22b, 22c and 22d, and they compare the number with zero and if coincident, produce a true signal of "1". An AND circuit 192 produces the true signal when values of the number NCP of packets present at various routes in the switch, checked by the table access circuits 22b, 22c and 22d, are all zero, thus indicating that the rerouting circuit is ready for release as will be described later.

An address distribution circuit 191 receives input signals S4, S7 and S9 to the table management unit 2, distributes the signals S4, S7 and S9 to the table access circuits in accordance with table address information contained in each of the signals S4, S7 and S9, and selects one of signals S5a, S5b, S5c and S5d delivered out of the table access circuits 22a, 22b, 22c and 22d and one of signals S11a, S11b, S11c and S11d also delivered out of these table access circuits to provide signals S5 and S11 which are delivered to the input control circuit and traffic management unit 3, respectively.

Figure 20:
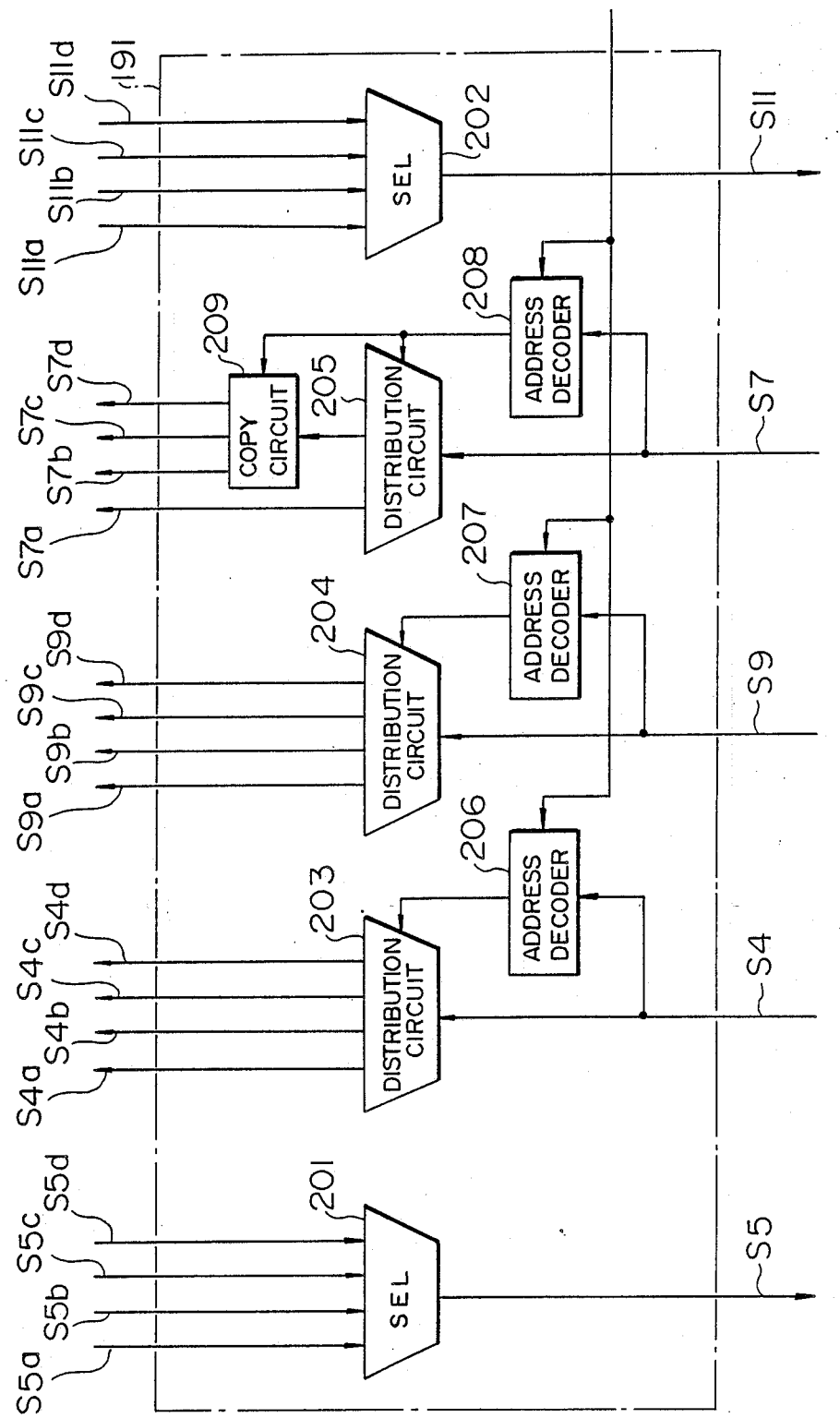
FIG. 20 details an address distribution circuit which is a component of the table management unit.

FIG. 20 illustrates an embodiment of the address distribution circuit 191. Selectors 201 and 202 each select one of active signals received from input lines and deliver the selected signal. Since the respective selectors 201 and 202 receive a single input signal at a time (i.e., only one of S5a–S5d and only one of S11a–S11d at a time) to provide the respective output signals S5 and S11 updated by the table management unit 2, each of the selectors 201 and 202 can pass through the single active input signal.

Address decoders 206, 207 and 208 each receive the table address information contained in the respective signals S4, S9 and S7 and decide which one of the four table access circuits 22a, 22b, 22c and 22d each signal is destined for, informing individual distribution circuits 203, 204 and 205 of the results. In rerouting and releasing the rerouting, the above decision is effected on the basis of a rerouted call routing control table address informed from the traffic management unit 3, the rerouted call routing control table address being the one assigned to a rerouted call in an idle address registered in the idle address registration area on the idle address management table. Distribution circuits 203 and 204 respond to the results informed from the address decoders 206 and 207 to deliver received signals to the table access circuits for which the received signals are destined. A distribution circuit 205 responds to the results informed from the address decoder 208 to deliver signal S7 destined for the table access circuit 22a to a line S7a and to deliver signal S7 (i.e., S7b, S7c and S7d) destined for the table access circuits 22b, 22c and 22d to a copy circuit 209. The copy circuit 209 relays signal S7 destined for the table access circuits 21b and 21c to lines S7b and S7c, respectively. Upon receipt of signal S7 destined for the table access circuit 21d, the copy circuit 209 relays is to a line S7d and at the same time prepares addresses for buffer destined routing control table 21b and intra-buffer routing control table 21c, at which addresses management information for the rerouted call corresponding to the signal is registered. The addresses thus prepared by the copy circuit are delivered to the lines S7b and S7c, respectively. At that time, the table access circuit 22d updates the contents of output line destined routing control table 21d (OS and IS—OS (=NCP)) and informs the comparator 193d of the updated number of packets NCP in the exchange. The table access circuits 22b and 22c do not update the contents of the routing control tables managed by them but calculate the number of corresponding packets of the rerouted call and inform the comparators 193b and 193c of values of the calculated number. Comparison results of the comparators 193b, 193c and 193d are sent to the AND circuit 192 and when the number of packets belonging to the rerouted call is "0" on all of the three routes, the AND circuit 192 produces the true signal. Accordingly, each time a packet belonging to the routing circuit is delivered from the output control circuit to the output line, the number of packets belonging to the rerouted call which are present in the exchange is checked. When the number of packets is zero, the route for the rerouted call is released from the rerouting circuit to recover the original route. In this manner, release of the rerouting circuit and recovery of the original route can be accomplished without disturbing sequence of packets belonging to the same call.

Figure 21A:
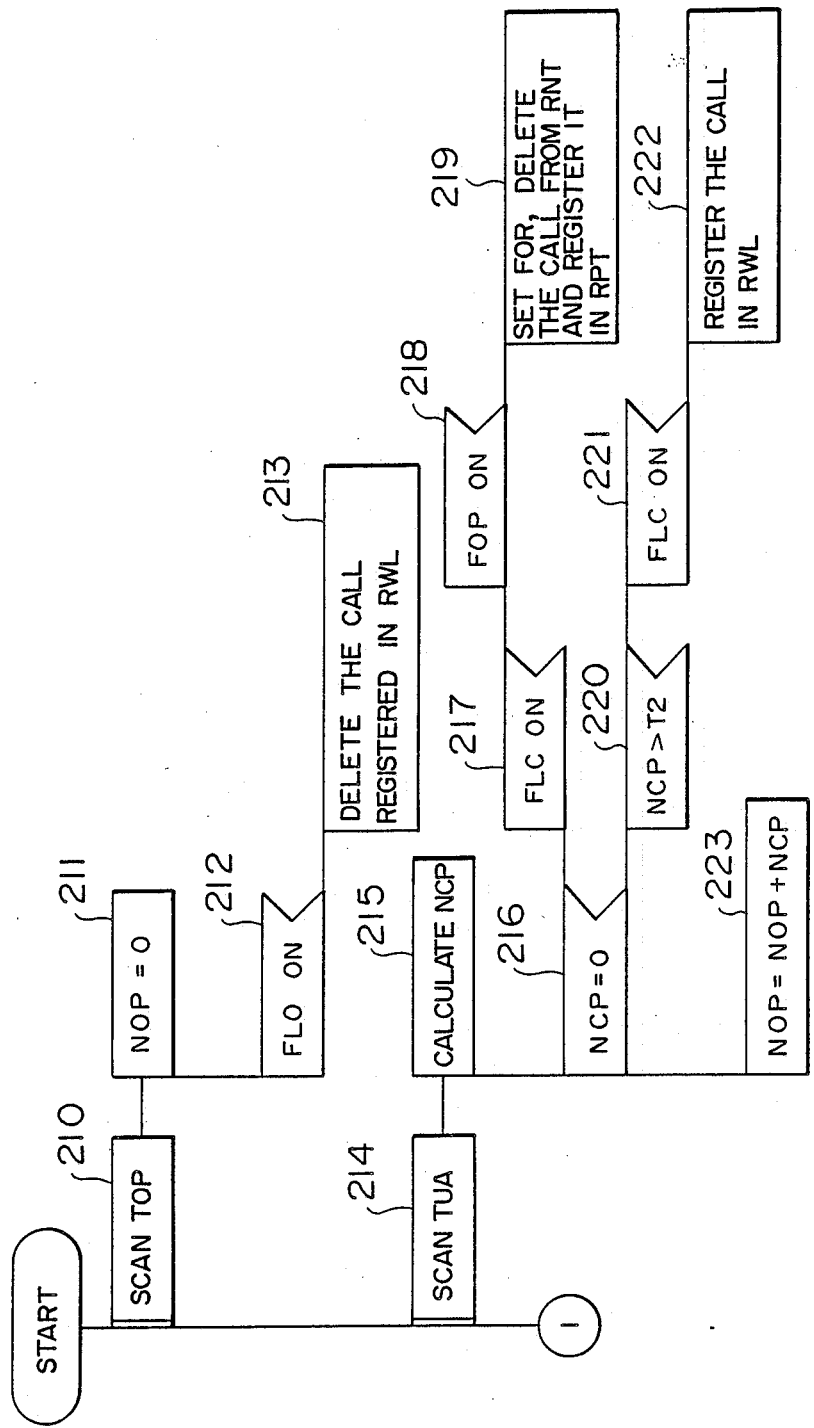
Figure 21B:
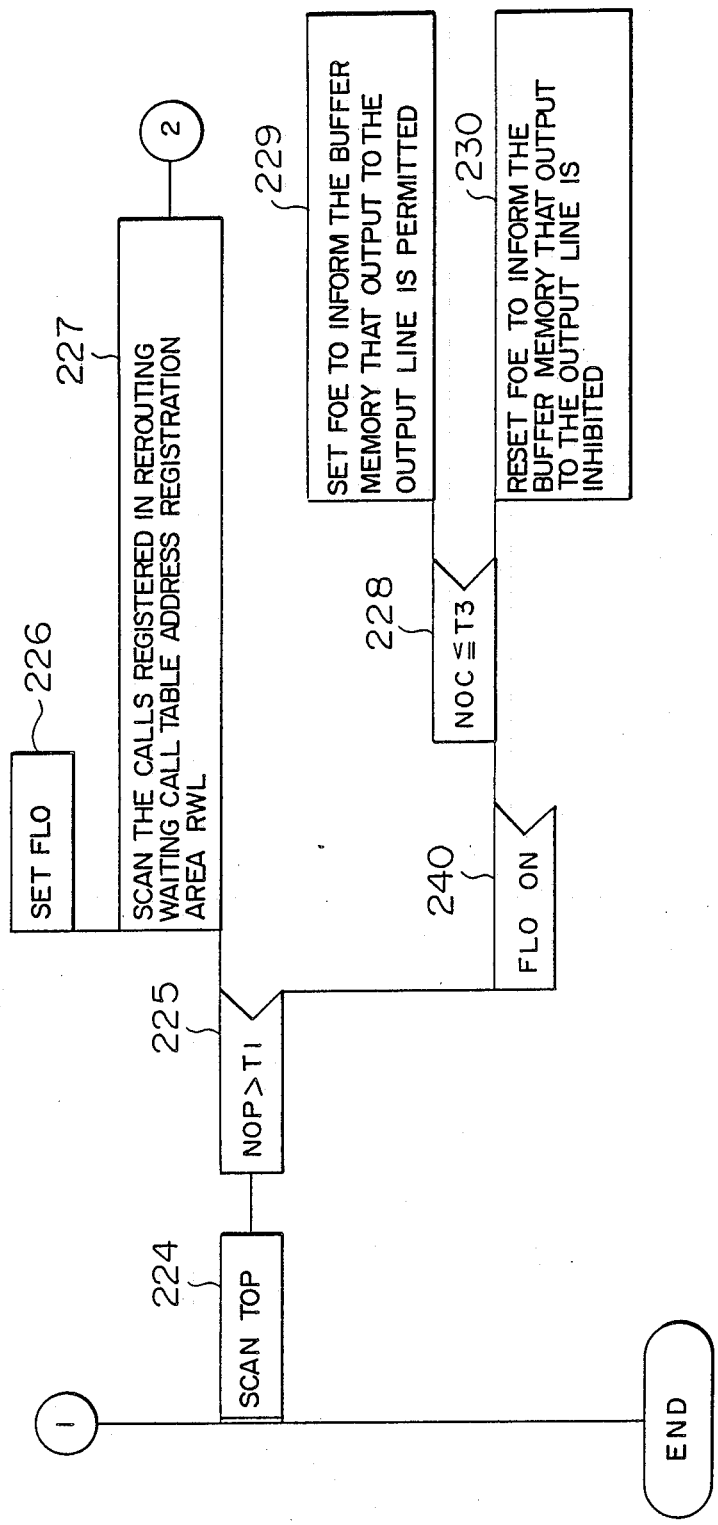
Figure 22:
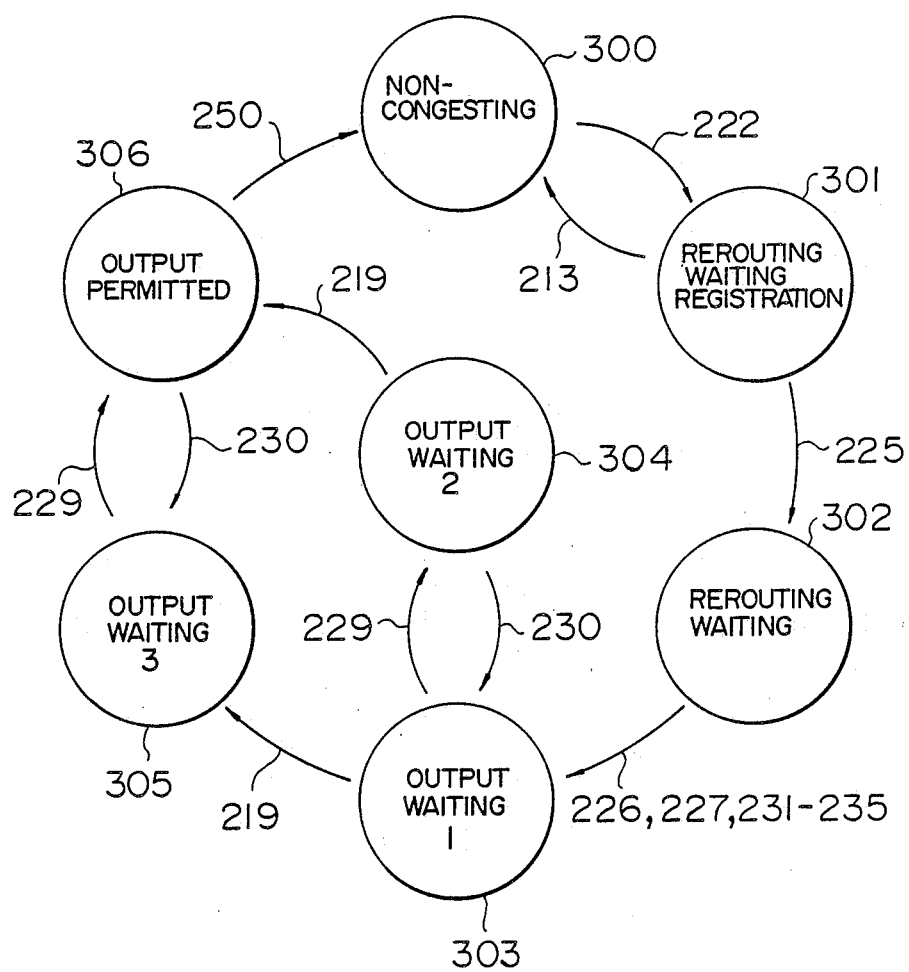
FIG. 22 is a diagram showing shift of call in the control operation procedure.

FIGS. 21a, 21b and 21c show a PAD diagram of rerouting decision and rerouting processing algorithm. FIG. 22 shows shift of status of call. The traffic management unit 3 executes this algorithm at a predetermined period to carry out rerouting decision and rerouting processing. On the assumption that the call initially takes a non-rerouting status (non-congestion) 300, the algorithm will be explained.

The processor 151 first scans the packet number management table (TOP) 154 (step 210) and initializes the number (NOP) of packets to "0" (step 211). When the rerouting line flag (FLO) is not "ON" indicating that the output line in question is not subjected to rerouting (step 212), a table address of the call registered in the rerouting waiting call table address registration area (RWL) is deleted (step 213). As a result, the call shifts from a rerouting waiting call registration status 301 to the non-congestion 300.

Subsequently, the processor 151 scans the used address management table 153 (TUA) (step 214) to read a table address TA and informs the table management unit 2 of the read table address, causing the table management unit to calculate the number (NCP) of packets in the exchange and inform the processor 151 of the calculated number (step 215). If the number NCP is "0" (step 216), the rerouted call flag (FLC) is checked (step 217). If the FLC is ON (step 217) and the output-permitted flag (FOP) is ON (step 218) indicating that packets belonging to the rerouted call which are inputted before the establishment of rerouting are all delivered out, the table address for the rerouted call is deleted from the RNT and then registered in the output-permitted call table address registration area (RPT) (step 219). Thus, the call is shifted from a call waiting 1 status 303 to a output waiting 3 status 305 or from an output waiting 2 status 304 to an output-permitted status 306. Through this procedure, for packets belonging to the same call, sequence between input packets present before the rerouting and input packets present after the rerouting can be conserved. If the number NCP is not zero (step 216) so as to exceed the second threshold T2 (step 220) and the FLC is not ON (step 221) indicating that the call is not rerouted but the reference value for rerouting is exceeded, the call of interest is registered in the RWL (step 222). As a result, the call is shifted from the non-congestion 300 to the rerouting waiting call registration status 301.

Thus, the number (NOP) of packets corresponding to the output line to which the call on the table TOP is delivered is added with the number NCP (step 223).

When the procedures covering the steps 214 to 223 are completed for all call table addresses registered on the management table TUA 153, the processor 151 scans the TOP (step 224). If the NOP exceeds the first threshold (T1) (step 225), a call registered in the RWL is rerouted. At that time, the call is shifted from the rerouting waiting call registration status 301 to a rerouting waiting status 302. The FLO on the line section in question of the TOP is first set (step 226) and subsequently all calls registered in the rerouting waiting call table address registration area RWL on the same line section are subjected to the following processing (step 227). An idle address for each of the buffer destined routing control table 21b, intra-buffer routing control table 21c and output line destined routing control table 21d is derived from the idle address management table 152 (step 231), output line number OC and output logical channel number OL for the rerouting circuit are set in each address, the values of IS and OS are set to a value of IS which prevails before the rerouting in a line section corresponding to the call in question of the intra-switch routing control table 21a (step 232). Subsequently, the addresses set in the buffer destined routing control table 21b, intra-buffer routing control table 21c and output line destined routing control table 21d are informed to the address distribution circuit 191 (step 233). Then, the FLC in a line section corresponding to the call of the used address management table TUA is set and the three addresses determined in the step 231 are registered in the used address management table TUA (step 234). Finally, the table address for the call is deleted from the rerouting waiting call table address registration area RWL and is then registered in the output not-permitted call table address registration area RNT (step 235). Through the above procedures, the rerouting of the call has been completed. At that time, the call is shifted from rerouting waiting status 302 to the output waiting 1 status 303.

When the packet number NOP on the packet number management table TOP does not exceed the first threshold (T1) (step 225), the rerouting line flag FLO is "ON" (step 240) and the packet number NOP is below the third threshold (T3) (step 228), the output-permitted line flag FOE is set to inform the buffer memory that output to the output line is permitted (step 229). At that time, the call is shifted from the output waiting 1 status 303 to the output waiting 2 status 304 or from the output waiting 3 status 305 to the output-permitted status 306. If the packet number NOP exceeds the third threshold T3, the output-permitted line flag FOE is reset to inform the buffer memory that output to the output line is inhibited (step 230).

By executing the above-described algorithm at a predetermined period, the traffic management unit 3 achieves the rerouting decision, rerouting and output control from the buffer memory in respect of the call.

Decision on the release of the rerouted call from the rerouting and its return to the route before rerouting is executed by the table management unit 2 as described previously. When the rerouted call is returned to the route before rerouting, the table management unit sets the respective values of IS and OS in the line section corresponding to the rerouted call of the intra-switch routing control table 21a to the respective values of IS and OS in the line section corresponding to the rerouted call of the output line destined routing control table, deletes the management information corresponding to the rerouted call from each of the buffer destined routing control table 21b, intra-buffer routing control table 21c and output line destined routing control table 21d, and informs the traffic management unit 3 of return information from the rerouting circuit. Receiving the return information, the traffic management unit 3 deletes the management information corresponding to the rerouted call from each of the used address management table 153 and packet number management table 154, and registers the unusable table addresses for the buffer destined routing control table 21b, intra-buffer routing control table 21c and output line destined routing control table 21d in the idle address management table 152 (step 250). Through this procedure, the call is shifted from the output-permitted status 306 to the non-congestion 300.

As is clear from the foregoing description, in accordance with the invention, the number of packets of each call which are present in the exchange can be grasped and the information indicative of the number of packets can be utilized for traffic control in the exchange to realize proper packet exchange.

We claim:

1. A packet exchange method for use in a packet exchange which receives packets from a plurality of call sources and delivers individual packets to predetermined individual output lines, said method comprising the steps of:
    assigning to individual input packets information regarding input sequence of the individual input packets in each call each time each input packet of said call is received and storing the input sequence information in a storage; and
    delivering said individual input packets sequentially to a predetermined output line and storing, each time each input packet is delivered to said output line, the input sequence information assigned to each packet in said storage as an output sequence information in said call of the delivered packets, and deciding the status of congestion of packets present in said exchange on the basis of said input sequence information and output sequence information.

2. A packet exchange method for use in a packet exchange system which receives packets from a plurality of call sources and delivers individual packets to predetermined individual output lines, said method comprising the steps of:
    assigning to individual packets input sequence of the individual packets in each call each time each packet of said call is received and storing the input sequence in a storage;
    delivering said individual packets sequentially to a predetermined output line and storing, each time one packet is delivered, the input sequence assigned to said one packet in said storage as an output sequence in said call of said one packet;
    detecting, on the basis of the input sequence and output sequence, whether the number of packets destined for each output line and remaining in said exchange system exceeds a predetermined threshold to cause congestion; and
    temporarily storing, when congestion is detected for an output line, at least one of input packets scheduled to be destined for said output line which is now subject to rerouting in a rerouting circuit having a buffer function.

3. A packet exchange method according to claim 2 further comprising the steps of:
    detecting whether the number of packets scheduled to be destined for said output line subject to rerouting which are inputted to said exchange system before execution of rerouting and which remain in said exchange system falls below a predetermined threshold;
    detecting whether packets belonging to the same call as that of said input packets stored in said rerouting circuit which are inputted to said exchange system before the execution of rerouting are all delivered to said output line subject to rerouting; and
    delivering said packets stored in said rerouting circuit to said output line subject to rerouting in accordance with results of the above detecting steps.

4. A packet exchange method according to claim 3 further comprising the steps of:
    detecting the number of packets present in said rerouting circuit; and
    releasing said rerouting circuit when a result of detection of the number indicates zero.

5. A packet exchange system for performing packet exchange by setting logical channels, comprising:
    an input port for receiving input packets;
    an output port for delivery exchanged packets;
    a packet switch connected between said input and output ports; and
    means coupled between said input and output ports for assigning to individual input packets information indicative of input sequence of the individual input packets counted in each call and storing the input sequence information, storing, each time each packet is delivered, said input sequence information assigned to an input packet as an output sequence information in a call to which said delivered packet belongs, and deciding the status of congestion of packets of said call which are present in said exchange on the basis of said stored input sequence information and output sequence information.

6. A packet exchange system according to claim 5 wherein said input sequence information and output sequence information are stored in a table which is looked up when an input logical channel number of each input packet is converted into an output logical channel number.

7. A packet exchange system for looking up a conversion table on the basis of an input logical channel number possessed by an input packet and an input line number possessed by an input line for the input packet, to determine an output line number for which said packet is scheduled to be destined and an output logical channel number to be assigned to an output packet, said system comprising:
    a packet switch coupled between input and output lines; and
    means coupled between said input and output lines for storing on said conversion table packet input sequence numbers and output sequence numbers set in respect of individual calls, looking up said conversion table when a packet of a call is inputted, to assign an output line number and an output logical channel number to said packet, and storing, when said packet is delivered through said packet switch to an output line having said output line number, and input sequence number possessed by said packet in said conversion table as an output sequence number in said call, whereby the number of packets of said call which remain in said exchange is grasped on the basis of the input sequence number and output sequence number on said conversion table.

8. A packet exchange system according to claim 7, further comprising a rerouting circuit coupled to said packet switch and having buffer function, and control means coupled to said storing means for changing the contents of said conversion table when it detects by looking up said conversion table that the number of packets remaining in said exchange which are destined for a specified output line exceeds a predetermined threshold, whereby input packets scheduled to be destined for said specified output line ar temporarily stored in said rerouting circuit.

9. A packet exchange system comprising:
means for managing a table including a conversion table which stores output line numbers and output logical channel numbers to be assigned to input packets and packet input sequence numbers and output sequence numbers set for the input packets in respect of individual calls;
a plurality of input control means connected to said managing means and further respectively connected to respective input lines, each of said plurality of input control means being responsive to an input packet to read out of said conversion table an output line number, an output logical channel number and an input sequence number which are to be assigned to said input packet and assign the read numbers to said input packet;
switch means, connected to said input control means, for supplying said input packet to an output line possessing the output line number assigned to said input packet;
a plurality of output control means connected to said managing means and further respectively connected between respective output lines and said switch means, one of said plurality of output control means corresponding to said input packet being operable to access said managing means when said input packet is delivered as an output packet to said output line through said switch means; and
means included in said managing means and being operable to respond to said accessing to rewrite the output sequence number of said input packet stored in said conversion table in accordance with the input sequence number assigned to said input packet, whereby the number of packets remaining in said exchange is grasped in respect of individual calls on the basis of said input sequence number and output sequence number on said conversion table.

10. A packet exchange system comprising:
means for managing a conversion table which stores output line numbers and output logical channel numbers to be assigned to input packets and packet input sequence numbers and output sequence numbers set for the input packets in respect of individual calls;
a plurality of input control means connected to said managing means and further respectively connected to respective input lines, each of said plurality of input control means being responsive to an input packet to read out of said conversion table an output line number, an output logical channel number and an input sequence number which are to be assigned to said input packet and assign the read numbers to said input packet;
switch means, connected to said plurality of input control means, for supplying said input packet to an output line possessing the output line number assigned to said input packet;
a plurality of output control means connected to said managing means and further respectively connected between respective output lines and said switch means, one of said plurality of output control means corresponding to said input packet being operable to access said managing means when said input packet is delivered as an output packet to said output line through said switch means;
means included in said table managing means and being operable to respond to said accessing to rewrite the output sequence number of said input packet stored in said conversion table in accordance with the input sequence number assigned to said input packet;
a rerouting circuit connected to one of said plurality of input control means and to one of said plurality of output control means and having a buffer function; and
means connected to said managing means and responsive to the number of packets remaining in said exchange in respect of each call, which number is known from said input sequence number and output sequence number on said conversion table, for changing said conversion table, when the number of packets remaining in said exchange in respect of a particular output line is detected to be in excess of a predetermined threshold, such that input packets scheduled to be destined for said particular output line are temporarily stored in said rerouting circuit.

11. A packet exchange system according to claim 10 wherein said rerouting circuit is connected to said one output control means having its input connected to said switch means and receiving a packet rerouted through said switch means and to said one input control means having its output connected to said switch means and supplying a packet to be rerouted through said switch means, and
wherein said rerouting circuit comprises a buffer memory, further output control means having its input connected to the output of said buffer memory and receiving a packet from said buffer memory and its output connected to the input of said one input control means, and further input control means having its input connected to the output of said one output control means and its output connected to said buffer memory and delivering a packet from said one output control means to said buffer memory.

12. A packet exchange system according to claim 11 wherein said conversion table comprises first, second and third conversion tables adapted to supply an input packet scheduled to be destined for said particular output line to said rerouting circuit, said first table being operable to store an output line number and an output logical channel number which are to be assigned to said input packet and are possessed by said one output control means as well as a packet input sequence number and a packet output sequence number which are set for said input packet in respect of the corresponding call, said second table being operable to store an output line number and an output logical channel number which are to be assigned to said packet inputted to said additional input control means and are possessed by said further output control means as well as a packet input sequence number and a packet output sequence number which are set for said packet in respect of the corresponding call, and said third table being operable to store an output line number of said particular output line and an output logical channel number which are to be assigned to said packet inputted to said further input control means as well as a packet input sequence number and an output sequence number which are set for said packet in respect of the corresponding call.

13. A packet exchange system according to claim 12 wherein said changing means comprises means operable, when two conditions are both satisfied wherein the number of packets which are scheduled to be destined for an output line subject to rerouting and which are inputted to said exchange system before execution of rerouting and still remain in said exchange falls below a predetermined threshold and wherein packets belonging to the same call as that of packets stored in said rerouting circuit and which are inputted to said exchange system before the execution of rerouting are all delivered, to control such that said packets stored in said buffer memory are permitted to be delivered to said output line subject to rerouting.

14. A packet exchange system according to claim 12 wherein said changing means comprises means for detecting, on the basis of said packet input sequence number and output sequence number on each of said first, second and third tables, whether the number of packets remaining on said rerouting circuit is zero and releasing said rerouting circuit when a detection result indicates zero.

* * * * *